US012388897B2

United States Patent
Li et al.

(10) Patent No.: US 12,388,897 B2
(45) Date of Patent: Aug. 12, 2025

(54) COMMUNICATION METHOD AND APPARATUS FOR ENABLING AN ON-BOARD FUNCTION FOR A VEHICLE

(71) Applicant: Shenzhen Yinwang Intelligent Technologies Co., Ltd., Shenzhen (CN)

(72) Inventors: Mingchao Li, Beijing (CN); Hang Liu, Beijing (CN); Zheng Zhou, Beijing (CN)

(73) Assignee: Shenzhen Yinwang Intelligent Technologies Co., Ltd., Shenzhen (CN)

( * ) Notice: Subject to any disclaimer, the term of this patent is extended or adjusted under 35 U.S.C. 154(b) by 690 days.

(21) Appl. No.: 17/581,847

(22) Filed: Jan. 21, 2022

(65) Prior Publication Data
US 2022/0144283 A1 May 12, 2022

Related U.S. Application Data

(63) Continuation of application No. PCT/CN2020/075613, filed on Feb. 17, 2020.

(30) Foreign Application Priority Data

Jul. 22, 2019 (CN) .......................... 201910662001.5

(51) Int. Cl.
*H04L 67/12* (2022.01)
*B60W 40/06* (2012.01)
(Continued)

(52) U.S. Cl.
CPC ............. *H04L 67/12* (2013.01); *B60W 40/06* (2013.01); *B60W 50/087* (2013.01);
(Continued)

(58) Field of Classification Search
None
See application file for complete search history.

(56) References Cited

U.S. PATENT DOCUMENTS 10,324,463 B1   6/2019  Konrardy et al.
11,237,571 B2 *  2/2022  Koda .................. G08G 1/0969
(Continued)

FOREIGN PATENT DOCUMENTS

CN    105118321 A    12/2015
CN    106971589 A     7/2017
(Continued)

OTHER PUBLICATIONS

Ashritha M et al., "RSU Based Efficient Vehicle Authentication Mechanism for V ANETs", IEEE Sponsored 9th International Conference on Intelligent Systems and Control (ISCO)2015, Total 5 Pages.

(Continued)

*Primary Examiner* — Lail A Kleinman
(74) *Attorney, Agent, or Firm* — Leydig, Voit & Mayer, Ltd.

(57) ABSTRACT

This disclosure relates to a communication method and an apparatus, applied to an internet of vehicles, for example, V2X, LTE-V, and V2V. An in-vehicle apparatus triggers an on-board function for a first vehicle. The first vehicle carries the in-vehicle apparatus. The in-vehicle apparatus checks whether the first vehicle is allowed to use the on-board function on a first road. When the first vehicle is on the first road, the in-vehicle apparatus enables or disables the on-board function based on a check result. In the embodiments of this disclosure, whether to enable a corresponding on-board function may be controlled, so that the on-board function is enabled without depending on a human requirement. In this way, the corresponding on-board function may be controlled to be applied to an appropriate road, to reduce a vehicle accident risk, and a danger to social security.

29 Claims, 7 Drawing Sheets

(51) Int. Cl.
*B60W 50/08* (2020.01)
*B60W 50/14* (2020.01)
*H04W 4/40* (2018.01)

(52) U.S. Cl.
CPC ......... *B60W 50/14* (2013.01); *B60W 2556/50* (2020.02); *H04W 4/40* (2018.02)

(56) References Cited

U.S. PATENT DOCUMENTS

| | | | |
|---|---|---|---|
| 2017/0099093 | A1 | 4/2017 | Zhang et al. |
| 2017/0302353 | A1 | 10/2017 | Rahman et al. |
| 2019/0143996 | A1 | 5/2019 | Fawaz et al. |
| 2019/0179312 | A1 | 6/2019 | Kong et al. |
| 2020/0020234 | A1* | 1/2020 | Cheng ................. G08G 1/0112 |
| 2020/0094829 | A1* | 3/2020 | Ohmura ................ B60W 30/10 |
| 2022/0126879 | A1* | 4/2022 | Igarashi ................ B60W 40/12 |

FOREIGN PATENT DOCUMENTS

| | | |
|---|---|---|
| CN | 109795505 A | 5/2019 |
| CN | 109903575 A | 6/2019 |
| CN | 109987096 A | 7/2019 |
| JP | 2017046080 A | 3/2017 |
| WO | 2017206019 A1 | 12/2017 |
| WO | 2018002904 A1 | 1/2018 |

OTHER PUBLICATIONS

Wang Xiaojie, "Research on Access Authentication Mechanism of Smart Collaborative Routing System", Beijing Jiaotong University, Apr. 2018, with an English abstract, total 100 pages.
Wang Daliang et al., "Ubuntu Standard Tutorial", People Post Press, May 2008, with an English abstract, total 16 pages.
Ji Yuefeng, etc., "Modern Communication Technologies", Beijing University of Posts and Telecommunications Press, Jan. 2014, with an English abstract, total 4 pages.

* cited by examiner

COMMUNICATION METHOD AND APPARATUS FOR ENABLING AN ON-BOARD FUNCTION FOR A VEHICLE

CROSS-REFERENCE TO RELATED APPLICATIONS

This application is a continuation of International Application No. PCT/CN2020/075613, filed on Feb. 17, 2020, which claims priority to Chinese Patent Application No. 201910662001.5, filed on Jul. 22, 2019. The disclosures of the aforementioned applications are hereby incorporated by reference in their entireties.

TECHNICAL FIELD

This application relates to the field of communications technologies, and in particular, to a communication method and an apparatus.

BACKGROUND

There may be a plurality of types of self-driving functions, such as, a high-speed automatic cruise function, or a vehicle automatic lane change function. Different self-driving functions have different dangers. Some self-driving functions have comparatively high dangers, and some self-driving functions may have comparatively low dangers. If a self-driving vehicle moves on a road with a complex environment and enables a self-driving function with a high danger, an accident is likely to occur. For example, if the self-driving vehicle moves on a road with a school or a hospital and enables an automatic lane change function, an accident risk may increase due to a large number of pedestrians on the road. Therefore, to ensure public safety, a government usually specifies a road on which the self-driving function can be used. In other words, the vehicle can enable the self-driving function only on specified roads. In principle, the self-driving function is not allowed to be used on a road on which the self-driving function is not specified to be used.

However, enablement of the self-driving function is currently determined manually, and is not controlled externally. Therefore, the self-driving function may be manually enabled even on the road on which the self-driving function is not specified to be used. In the event someone maliciously (or even if the driver inadvertently) enables the self-driving function on a road that is inappropriate for the self-driving function, a vehicle accident may occur, which can result in great harm and physical injury.

SUMMARY

Embodiments of this disclosure provide a communication method and an apparatus, to reduce a possibility of a vehicle accident.

According to a first aspect, a first communication method is provided. The method includes: an in-vehicle apparatus determines an on-board function for a first vehicle. The in-vehicle apparatus determines (i.e., checks) whether the first vehicle is allowed to use the on-board function on a first road. When the first vehicle is on the first road, the in-vehicle apparatus enables or disables the on-board function based on the determined (checked) result.

The method in the first aspect may be performed by a first communications apparatus. The first communications apparatus may be a communications device or a communications apparatus that can support a communications device in implementing a function required in the method. For example, the first communications apparatus is a chip system. Further, the communications device may be the in-vehicle apparatus. In the following description process, an example in which the communications device is the in-vehicle apparatus is provided for effect analysis.

In this embodiment of this disclosure, if the in-vehicle apparatus determines the on-board function and whether or not the on-board function can be used on the road ("first road") on which the in-vehicle apparatus is traveling. In accordance with this determination (also referred to as a "check result"), the in-vehicle apparatus determines whether to enable or disable the on-board function based on the check result. For example, if the check fails, the first vehicle is not allowed to use the on-board function on the first road, and the in-vehicle apparatus may disable the on-board function. Whether to enable a corresponding on-board function is controlled, so that the on-board function is enabled without depending on a human requirement. In this way, the corresponding on-board function may be controlled to be applied to an appropriate road, to reduce a vehicle accident risk, and a danger to social security.

In a possible implementation of the first aspect, the method further includes: The in-vehicle apparatus determines whether or not to enable the determined on-board function, based on information about the first road.

For example, the information about the first road may be from a roadside apparatus. After obtaining the information about the first road, the roadside apparatus may send the information about the first road to the in-vehicle apparatus, so that the in-vehicle apparatus may determine, based on the information about the first road, the to-be-triggered on-board function.

With reference to the first aspect, in a possible implementation of the first aspect, the method further includes:

The in-vehicle apparatus learns of (obtains) a mapping relationship. The mapping relationship includes a mapping relationship between information about a road and a vehicle function.

That the in-vehicle apparatus determines, based on information about the first road, the triggered on-board function includes:

The in-vehicle apparatus determines the on-board function based on the information about the first road and the mapping relationship.

The mapping relationship includes the mapping relationship between the information about the road and the vehicle function. It may be considered that, in the mapping relationship, if information about one road corresponds to one on-board function, the on-board function can be used on the road corresponding to the information about the road. Therefore, the in-vehicle apparatus may determine, based on the mapping relationship and the information about the first road, a vehicle function corresponding to the information about the first road, and then select to determine one from the determined vehicle function. In this way, the on-board function determined by the in-vehicle apparatus may be as much as possible the on-board function that is allowed to be used on the first road. The on-board function is applied to the appropriate road, to reduce the vehicle accident risk, and the danger to the social security.

With reference to the first aspect, in a possible implementation of the first aspect, the obtaining in-vehicle apparatus of a mapping relationship includes:

The in-vehicle apparatus receives the mapping relationship from a roadside apparatus; the in-vehicle apparatus obtains the mapping relationship that is pre-configured; or the in-vehicle apparatus obtains a map from a server, and the mapping relationship included in the map.

If the in-vehicle apparatus receives the mapping relationship from the roadside apparatus, the in-vehicle apparatus learns of the mapping relationship by receiving signaling. If the in-vehicle apparatus obtains the mapping relationship that is pre-configured, the in-vehicle apparatus has stored (or pre-stored) the mapping relationship. Alternatively, if the in-vehicle apparatus obtains the map from the server, and the mapping relationship from the map, the in-vehicle apparatus learns of the mapping relationship by receiving signaling. Manners in which the in-vehicle apparatus learns of the mapping relationship are not limited to the several manners, and are flexible.

With reference to the first aspect, in a possible implementation of the first aspect, the method further includes:

The in-vehicle apparatus receives the information about the first road from the roadside apparatus, or the in-vehicle apparatus obtains a map from a server, and the information about the first road included in the map.

The in-vehicle apparatus may obtain the information about the first road in a plurality of manners. For example, the in-vehicle apparatus may receive the information about the first road from the roadside apparatus, or obtain the information about the first road by using map information, or in another manner.

With reference to the first aspect, in a possible implementation of the first aspect, that the in-vehicle apparatus checks whether the first vehicle is allowed to use the on-board function on a first road includes:

The in-vehicle apparatus checks a first check sequence to obtain the check result.

When the check result indicates that the check on the first check sequence succeeds, the first vehicle is allowed to use the on-board function on the first road.

When the check result indicates that the check on the first check sequence fails, the first vehicle is not allowed to use the on-board function on the first road, and the first check sequence is a check sequence corresponding to the on-board function.

The on-board function may have the corresponding first check sequence. The in-vehicle apparatus checks the first check sequence, to determine whether the on-board function is allowed to be used on the first road. A check manner is simple.

With reference to the first aspect, in a possible implementation of the first aspect, the method further includes:

The in-vehicle apparatus determines, based on the information about the first road, the on-board function that is allowed to be used by the first vehicle on the first road, and obtains the first check sequence corresponding to the on-board function, or the in-vehicle apparatus determines, the on-board function supported by the first vehicle, and obtains the first check sequence corresponding to the on-board function.

The in-vehicle apparatus may obtain only a check sequence of the on-board function that is allowed to be used on the first road, to reduce a quantity of obtained check sequences. In this case, if one on-board function is a function that is not allowed to be used on the first road, the on-board function does not correspond to the check sequence. When the in-vehicle apparatus checks, if the on-board function does not correspond to the check sequence, the in-vehicle apparatus may directly consider that the on-board function fails to be checked. This simplifies an actual check process. Alternatively, the in-vehicle apparatus may also obtain check sequences of all on-board functions supported by the first vehicle. In this way, the obtained check sequences are complete. During the check, regardless of whether one on-board function is the on-board function that is allowed to be used on the first road, the on-board function has a corresponding check sequence. Therefore, the check can be performed based on the check sequence, to improve check accuracy.

With reference to the first aspect, in a possible implementation of the first aspect, that the in-vehicle apparatus obtains the first check sequence corresponding to the on-board function includes:

The in-vehicle apparatus calculates the first check sequence based on an identifier of the on-board function;
  the in-vehicle apparatus receives the first check sequence that is from the roadside apparatus and that corresponds to the on-board function; or
  the in-vehicle apparatus sends an identifier of the on-board function to the roadside apparatus, and receives the first check sequence from the roadside apparatus.

The in-vehicle apparatus may calculate the check sequence by the in-vehicle apparatus, or obtain the check sequence from the roadside apparatus. The roadside apparatus may actively send the check sequence to the in-vehicle apparatus, and does not need a request from the in-vehicle apparatus, to reduce signaling interaction between the in-vehicle apparatus and the roadside apparatus. Alternatively, the roadside apparatus may send the corresponding check sequence to the in-vehicle apparatus after receiving a request from the in-vehicle apparatus, to send the target check sequence.

With reference to the first aspect, in a possible implementation of the first aspect, that the in-vehicle apparatus calculates the first check sequence based on an identifier of the on-board function includes:

The in-vehicle apparatus calculates the first check sequence based on the identifier of the on-board function;
  the in-vehicle apparatus calculates the first check sequence based on the identifier of the on-board function and a random sequence;
  the in-vehicle apparatus calculates the first check sequence based on the identifier of the on-board function and an identifier of the roadside apparatus; or
  the in-vehicle apparatus calculates the first check sequence based on the identifier of the on-board function, a random sequence, and an identifier of the roadside apparatus.

When calculating the first check sequence, the in-vehicle apparatus may consider a plurality of different elements. This is not specifically limited.

With reference to the first aspect, in a possible implementation of the first aspect, the information about the first road includes one or any combination of the following:
  a type of the first road,
  a geographical range of the first road,
  track information of the first road,
  an identifier of the first road,
  an identity of a lane on the first road, or
  an effective time period corresponding to the first road, where the type of the first road is effective within the effective time period.

Only some information included in the information about the first road is listed herein. In addition to the information, the information about the first road may further include other information. Alternatively, the information about the first road does not include the foregoing information, but includes other information. This is not limited in this embodiment of this disclosure.

According to a second aspect, a second communication method is provided. The method includes a roadside apparatus receives an identifier of an on-board function from an in-vehicle apparatus. The roadside apparatus determines whether a vehicle is allowed to use the on-board function on a first road. The roadside apparatus sends first information to the in-vehicle apparatus.

The method in the second aspect may be performed by a second communications apparatus. The second communications apparatus may be a communications device or a communications apparatus that can support a communications device in implementing a function required in the method. For example, the second communications apparatus is a chip system. Further, the communications device may be the roadside apparatus. In the following description process, an example in which the communications device is the roadside apparatus is used for effect analysis.

After receiving the identifier of the on-board function from the in-vehicle apparatus, the roadside apparatus may determine whether the vehicle is allowed to use the on-board function on the first road. For example, if the vehicle is not allowed to use the on-board function on the first road, the roadside apparatus may not send a check sequence corresponding to the on-board function to the in-vehicle apparatus. Therefore, the in-vehicle apparatus fails to check the on-board function, and the in-vehicle apparatus does not use the on-board function. In this way, a corresponding on-board function may be controlled to be applied to an appropriate road, to reduce a vehicle accident risk, and a danger to social security.

With reference to the second aspect, in a possible implementation of the second aspect, the first information is used to indicate whether the vehicle is allowed to use the on-board function on the first road.

Regardless of whether the vehicle is allowed to use the on-board function on the first road, the roadside apparatus may send the first information to the in-vehicle apparatus, so that the in-vehicle apparatus can specify a request result.

With reference to the second aspect, in a possible implementation of the second aspect, that the roadside apparatus determines that the vehicle is allowed to use the on-board function on the first road, and that the roadside apparatus sends first information to the in-vehicle apparatus include:

The roadside apparatus sends to the in-vehicle apparatus, the first check sequence corresponding to the on-board function.

If the vehicle is allowed to use the on-board function on the first road, the roadside apparatus may send the first check sequence to the in-vehicle apparatus, so that the in-vehicle apparatus may check the on-board function based on the first check sequence.

With reference to the second aspect, in a possible implementation of the second aspect, that the roadside apparatus obtains a first check sequence corresponding to the on-board function includes:

The roadside apparatus calculates the first check sequence based on the identifier of the on-board function;
the roadside apparatus calculates the first check sequence based on the identifier of the on-board function and a random sequence;
the roadside apparatus calculates the first check sequence based on the identifier of the on-board function and an identifier of the roadside apparatus; or
the roadside apparatus calculates the first check sequence based on the identifier of the on-board function, a random sequence, and an identifier of the roadside apparatus.

When calculating the first check sequence, the roadside apparatus may consider a plurality of different elements. This is not specifically limited.

With reference to the second aspect, in a possible implementation of the second aspect, that the roadside apparatus determines that the vehicle is not allowed to use the on-board function on the first road, and that the roadside apparatus sends first information to the in-vehicle apparatus include:

The roadside apparatus sends indication information to the in-vehicle apparatus. The indication information is used to indicate a request failure, or a reason why the vehicle is not allowed to use the on-board function on the first road.

If the vehicle is not allowed to use the on-board function on the first road, the roadside apparatus may notify the in-vehicle apparatus of the request failure, or may notify the in-vehicle apparatus of a request failure reason, so that the in-vehicle apparatus can specify a problem.

With reference to the second aspect, in a possible implementation of the second aspect, the method further includes: The roadside apparatus sends information about the first road to the in-vehicle apparatus. The information about the first road is used to determine the on-board function that is allowed to be used by the vehicle on the first road.

For example, the roadside apparatus may obtain the information about the first road by using an apparatus, for example, a sensor unit (for example, a sensor) disposed on a road side, and send the information about the first road to the in-vehicle apparatus, so that the in-vehicle apparatus can determine the on-board function that is allowed to be used by the vehicle on the first road.

With reference to the second aspect, in a possible implementation of the second aspect, the information about the first road includes one or any combination of the following:
a type of the first road,
a geographical range of the first road,
track information of the first road,
an identifier of the first road,
an identity of a lane on the first road, or
an effective time period corresponding to the first road, where the type of the first road is effective within the effective time period.

Only some information included in the information about the first road is listed herein. In addition to the information, the information about the first road may further include other information. Alternatively, the information about the first road does not include the foregoing information, but includes other information. This is not limited in this embodiment of this disclosure.

According to a third aspect, a third communication method is provided. The method includes: An in-vehicle apparatus receives information about a first road. The in-vehicle apparatus determines, based on a mapping relationship between information about a road and a vehicle function and the information about the first road, a function that is allowed to be used by a first vehicle on the first road. The first vehicle carries the in-vehicle apparatus.

The method in the third aspect may be performed by a third communications apparatus. The third communications apparatus may be a communications device or a communications apparatus that can support a communications device in implementing a function required in the method. For example, the third communications apparatus is a chip system. Further, the communications device may be the in-vehicle apparatus. In the following description process, an example in which the communications device is the in-vehicle apparatus is used for effect analysis.

In the mapping relationship, if information about one road corresponds to one on-board function, it indicates that the on-board function can be used on the road corresponding to the information about the road. Therefore, the in-vehicle apparatus may determine, based on the mapping relationship and the information about the first road, a vehicle function corresponding to the information about the first road, and then select to trigger one from the determined vehicle function. In this way, the on-board function triggered by the in-vehicle apparatus may be as much as possible the on-board function that is allowed to be used on the first road. The on-board function is applied to an appropriate road, to reduce a vehicle accident risk, and a danger to social security.

With reference to the third aspect, in a possible implementation of the third aspect, the method further includes: The in-vehicle apparatus enables an on-board function. The on-board function is the function that is allowed to be used by the first vehicle on the first road, or a function that is not allowed to be used by the first vehicle on the first road. The in-vehicle apparatus sends state information. The state information is used to indicate that the first vehicle enables the on-board function.

After enabling the on-board function, the in-vehicle device may send the state information. For example, the in-vehicle device may broadcast the state information, or send the state information in a multicast manner or a unicast manner. For example, the in-vehicle apparatus sends the state information to a roadside apparatus in the unicast manner, so that after receiving the state information, the roadside apparatus may determine that the first vehicle enables the on-board function, and further determine whether the on-board function is the function that is allowed to be used by the vehicle on the first road. If the on-board function is the function that is not allowed to be used by the vehicle on the first road, the roadside apparatus may record that the in-vehicle apparatus violates a law. A specific penalty measure may be subsequently taken on the in-vehicle apparatus, to reduce a possibility that the in-vehicle apparatus enables the on-board function that is not allowed to be used on the road, and improve security coefficient.

With reference to the third aspect, in a possible implementation of the third aspect, the information about the first road includes one or any combination of the following:
 a type of the first road,
 a geographical range of the first road,
 track information of the first road,
 an identifier of the first road,
 an identity of a lane on the first road, or
 an effective time period corresponding to the first road,
  where the type of the first road is effective within the effective time period.

Only some information included in the information about the first road is listed herein. In addition to the information, the information about the first road may further include other information. Alternatively, the information about the first road does not include the foregoing information, but includes other information. This is not limited in this embodiment of this disclosure.

According to a fourth aspect, a fourth communication method is provided. The method includes: A roadside apparatus receives state information from an in-vehicle apparatus. The state information is used to indicate that a first vehicle that carries the in-vehicle apparatus enables an on-board function. The roadside apparatus determines whether a vehicle is allowed to use the on-board function on a first road. When the vehicle is not allowed to use the on-board function on the first road, the roadside apparatus records an event that the first vehicle enables the on-board function as a violation event.

The method in the fourth aspect may be performed by a fourth communications apparatus. The fourth communications apparatus may be a communications device or a communications apparatus that can support a communications device in implementing a function required in the method. For example, the fourth communications apparatus is a chip system. Further, the communications device may be the roadside apparatus. In the following description process, an example in which the communications device is the roadside apparatus is used for effect analysis.

After receiving the state information from the in-vehicle apparatus, the roadside apparatus may determine that the first vehicle enables the on-board function, and further determine whether the on-board function is a function that is allowed to be used by the vehicle on the first road. If the on-board function is a function that is not allowed to be used by the vehicle on the first road, the roadside apparatus may record that the in-vehicle apparatus violates a law. A specific penalty measure may be subsequently performed on the in-vehicle apparatus, to reduce a possibility that the in-vehicle apparatus enables the on-board function that is not allowed to be used on the road, and improve a security coefficient.

With reference to the fourth aspect, in a possible implementation of the fourth aspect, that the roadside apparatus determines whether a vehicle is allowed to use the on-board function on a first road includes:

The roadside apparatus determines, based on a mapping relationship between information about a road and a vehicle function, whether the on-board function corresponds to the first road. When the on-board function corresponds to the first road, the vehicle is allowed to use the on-board function on the first road. Otherwise, the vehicle is not allowed to use the on-board function on the first road.

The roadside apparatus may determine, based on a specified mapping relationship, whether the vehicle is allowed to use the on-board function on the first road. A determining manner is simple.

According to a fifth aspect, a communications apparatus is provided. For example, the communications apparatus is the first communications apparatus described above. The communications apparatus is configured to perform the method according to any one of the first aspect or the possible implementations of the first aspect. Specifically, the communications apparatus may include modules configured to perform the method according to any one of the first aspect or the possible implementations of the first aspect. For example, the communications apparatus includes a processing module and a transceiver module. The transceiver module may be a function module. The function module can complete functions of receiving information, and sending information. Alternatively, the transceiver module may be a general term of a sending module and a receiving module. The sending module is configured to complete a function of sending information, and the receiving module is configured to complete a function of receiving information. For example, the communications apparatus is an in-vehicle apparatus. The processing module is configured to trigger an on-board function for a first vehicle. The first vehicle carries the in-vehicle apparatus.

The processing module is further configured to check whether the first vehicle is allowed to use the on-board function on a first road.

The processing module is further configured to enable or disable the on-board function based on a check result when the first vehicle is on the first road.

With reference to the fifth aspect, in a possible implementation of the fifth aspect, the processing module is further configured to determine, based on information about the first road, the triggered on-board function.

With reference to the fifth aspect, in a possible implementation of the fifth aspect,
the processing module is further configured to learn of a mapping relationship. The mapping relationship includes a mapping relationship between information about a road and a vehicle function.

The processing module is configured to determine, based on the information about the first road, in the following manner, the triggered on-board function: determining the on-board function based on the information about the first road and the mapping relationship.

With reference to the fifth aspect, in a possible implementation of the fifth aspect, the processing module is configured to learn of the mapping relationship in the following manner:
receiving the mapping relationship from a roadside apparatus by using the transceiver module;
obtaining the mapping relationship that is pre-configured; or
obtaining a map from a server, and the mapping relationship included in the map.

With reference to the fifth aspect, in a possible implementation of the fifth aspect,
the transceiver module is further configured to receive the information about the first road from the roadside apparatus; or
the processing module is further configured to obtain a map from a server, and the information about the first road included in the map.

With reference to the fifth aspect, in a possible implementation of the fifth aspect, the processing module is configured to check, in the following manner, whether the first vehicle is allowed to use the on-board function on the first road:
checking a first check sequence to obtain the check result.

When the check result indicates that the check on the first check sequence succeeds, the first vehicle is allowed to use the on-board function on the first road.

When the check result indicates that the check on the first check sequence fails, the first vehicle is not allowed to use the on-board function on the first road, and the first check sequence is a check sequence corresponding to the on-board function.

With reference to the fifth aspect, in a possible implementation of the fifth aspect, the processing module is further configured to:
determine, based on the information about the first road, the on-board function that is allowed to be used by the first vehicle on the first road, and obtain the first check sequence corresponding to the on-board function; or
determine the on-board function supported by the first vehicle, and obtain the first check sequence corresponding to the on-board function.

With reference to the fifth aspect, in a possible implementation of the fifth aspect, the processing module is configured to obtain, in the following manner, the first check sequence corresponding to the on-board function:
calculating the first check sequence based on an identifier of the on-board function;
receiving, by using the transceiver module, the first check sequence that is from the roadside apparatus and that corresponds to the on-board function; or
sending, by using the transceiver module, an identifier of the on-board function to the roadside apparatus, and receiving the first check sequence from the roadside apparatus.

With reference to the fifth aspect, in a possible implementation of the fifth aspect, the processing module is configured to calculate the first check sequence based on the identifier of the on-board function in the following manner:
calculating the first check sequence based on the identifier of the on-board function;
calculating the first check sequence based on the identifier of the on-board function and a random sequence;
calculating the first check sequence based on the identifier of the on-board function and an identifier of the roadside apparatus; or
calculating the first check sequence based on the identifier of the on-board function, a random sequence, and an identifier of the roadside apparatus.

With reference to the fifth aspect, in a possible implementation of the fifth aspect, the information about the first road includes one or any combination of the following:
a type of the first road,
a geographical range of the first road,
track information of the first road,
an identifier of the first road,
an identity of a lane on the first road, or
an effective time period corresponding to the first road, where the type of the first road is effective within the effective time period.

For technical effects of the fifth aspect or the possible implementations of the fifth aspect, refer to the description of the technical effects of the first aspect or the possible implementations of the first aspect.

According to a sixth aspect, a communications apparatus is provided. For example, the communications apparatus is the second communications apparatus described above. The communications apparatus is configured to perform the method according to any one of the second aspect or the possible implementations of the second aspect. Specifically, the communications apparatus may include modules configured to perform the method according to any one of the second aspect or the possible implementations of the second aspect. For example, the communications apparatus includes a processing module and a transceiver module. The transceiver module may be a function module. The function module can complete functions of receiving information, and sending information. Alternatively, the transceiver module may be a general term of a sending module and a receiving module. The sending module is configured to complete a function of sending information, and the receiving module is configured to complete a function of receiving information. For example, the communications apparatus is a roadside apparatus. The transceiver module is configured to receive an identifier of an on-board function from an in-vehicle apparatus.

The processing module is configured to determine whether a vehicle is allowed to use the on-board function on a first road.

The transceiver module is further configured to send first information to the in-vehicle apparatus.

With reference to the sixth aspect, in a possible implementation of the sixth aspect, the first information is used to indicate whether the vehicle is allowed to use the on-board function on the first road.

With reference to the sixth aspect, in a possible implementation of the sixth aspect, the processing module determines that the vehicle is allowed to use the on-board function on the first road, and the transceiver module is configured to send the first information to the in-vehicle apparatus in the following manner: sending a first check sequence corresponding to the on-board function to the in-vehicle apparatus.

With reference to the sixth aspect, in a possible implementation of the sixth aspect, the processing module is configured to obtain, in the following manner, the first check sequence corresponding to the on-board function:
- calculating the first check sequence based on the identifier of the on-board function;
- calculating the first check sequence based on the identifier of the on-board function and a random sequence;
- calculating the first check sequence based on the identifier of the on-board function and an identifier of the roadside apparatus; or
- calculating the first check sequence based on the identifier of the on-board function, a random sequence, and an identifier of the roadside apparatus.

With reference to the sixth aspect, in a possible implementation of the sixth aspect, the processing module determines that the vehicle is not allowed to use the on-board function on the first road, and the transceiver module is configured to send the first information to the in-vehicle apparatus in the following manner: sending indication information to the in-vehicle apparatus. The indication information is used to indicate a request failure, or a reason why the vehicle is not allowed to use the on-board function on the first road.

With reference to the sixth aspect, in a possible implementation of the sixth aspect, the transceiver module is further configured to send information about the first road to the in-vehicle apparatus. The information about the first road is used to determine the on-board function that is allowed to be used by the vehicle on the first road.

With reference to the sixth aspect, in a possible implementation of the sixth aspect, the information about the first road includes one or any combination of the following:
- a type of the first road,
- a geographical range of the first road,
- track information of the first road,
- an identifier of the first road,
- a number of a lane corresponding to the first road, or
- an effective time period corresponding to the first road, where the type of the first road is effective within the effective time period.

For technical effects of the sixth aspect or the possible implementations of the sixth aspect, refer to the description of the technical effects of the second aspect or the possible implementations of the second aspect.

According to a seventh aspect, a communications apparatus is provided. For example, the communications apparatus is the third communications apparatus described above. The communications apparatus is configured to perform the method in any one of the third aspect or the possible implementations of the third aspect. Specifically, the communications apparatus may include modules configured to perform the method in any one of the third aspect or the possible implementations of the third aspect. For example, the communications apparatus includes a processing module and a transceiver module. The transceiver module may be a function module. The function module can complete functions of receiving information, and sending information. Alternatively, the transceiver module may be a general term of a sending module and a receiving module. The sending module is configured to complete a function of sending information, and the receiving module is configured to complete a function of receiving information. For example, the communications apparatus is an in-vehicle apparatus. The transceiver module is configured to receive information about a first road.

The processing module is configured to determine, based on a mapping relationship between information about a road and a vehicle function and the information about the first road, a function that is allowed to be used by a first vehicle on the first road. The first vehicle carries the in-vehicle apparatus.

With reference to the seventh aspect, in a possible implementation of the seventh aspect,
the processing module is further configured to enable an on-board function. The on-board function is the function that is allowed to be used by the first vehicle on the first road, or a function that is not allowed to be used by the first vehicle on the first road.

The transceiver module is further configured to send state information. The state information is used to indicate that the first vehicle enables the on-board function.

With reference to the seventh aspect, in a possible implementation of the seventh aspect, the information about the first road includes one or any combination of the following:
- a type of the first road,
- a geographical range of the first road,
- track information of the first road,
- an identifier of the first road,
- an identity of a lane on the first road, or
- an effective time period corresponding to the first road, where the type of the first road is effective within the effective time period.

For technical effects of the seventh aspect or the possible implementations of the seventh aspect, refer to the description of the technical effects of the third aspect or the possible implementations of the third aspect.

According to an eighth aspect, a communications apparatus is provided. For example, the communications apparatus is the fourth communications apparatus described above. The communications apparatus is configured to perform the method in any one of the fourth aspect or the possible implementations of the fourth aspect. Specifically, the communications apparatus may include modules configured to perform the method in any one of the fourth aspect or the possible implementations of the fourth aspect. For example, the communications apparatus includes a processing module and a transceiver module. The transceiver module may be a function module. The function module can complete functions of receiving information, and sending information. Alternatively, the transceiver module may be a general term of a sending module and a receiving module. The sending module is configured to complete a function of sending information, and the receiving module is configured to complete a function of receiving information. For example, the communications apparatus is a roadside apparatus. The transceiver module is configured to receive state information from an in-vehicle apparatus. The state information is used to indicate that a first vehicle that carries the in-vehicle apparatus enables an on-board function.

The processing module is configured to determine whether a vehicle is allowed to use the on-board function on a first road.

The processing module is further configured to: when the vehicle is not allowed to use the on-board function on the first road, record an event that the first vehicle enables the on-board function as a violation event.

With reference to the eighth aspect, in a possible implementation of the eighth aspect, the processing module is configured to determine, in the following manner, whether the vehicle is allowed to use the on-board function on the first road:

determining, based on a mapping relationship between information about a road and a vehicle function, whether the on-board function corresponds to the first road. When the on-board function corresponds to the first road, the vehicle is allowed to use the on-board function on the first road. Otherwise, the vehicle is not allowed to use the on-board function on the first road.

For technical effects of the eighth aspect or the possible implementations of the eighth aspect, refer to the description of the technical effects of the fourth aspect or the possible implementations of the fourth aspect.

According to a ninth aspect, a communications apparatus is provided. The communications apparatus is, for example, the first communications apparatus described above. The communications apparatus includes a processor and a transceiver. The processor and the transceiver are configured to implement the method described in the first aspect or the possible designs of the first aspect. For example, the communications apparatus is a chip disposed in a communications device. For example, the transceiver is implemented by using an antenna, a feeder, a codec, and the like in the communications device. Alternatively, if the communications apparatus is the chip disposed in the communications device, the transceiver is, for example, a communications interface in the chip. The communications interface is connected to a radio frequency transceiver component in the communications device, to receive and send information by using the radio frequency transceiver component. For example, the communications apparatus is an in-vehicle apparatus. The processor is configured to trigger an on-board function for a first vehicle. The first vehicle carries the in-vehicle apparatus.

The processor is further configured to check whether the first vehicle is allowed to use the on-board function on a first road.

The processor is further configured to enable or disable the on-board function based on a check result when the first vehicle is on the first road.

With reference to the ninth aspect, in a possible implementation of the ninth aspect, the processor is further configured to determine, based on information about the first road, the triggered on-board function.

With reference to the ninth aspect, in a possible implementation of the ninth aspect, the processor is further configured to learn of a mapping relationship. The mapping relationship includes a mapping relationship between information about a road and a vehicle function.

The processor is configured to determine, based on the information about the first road, in the following manner, the triggered on-board function: determining the on-board function based on the information about the first road and the mapping relationship.

With reference to the ninth aspect, in a possible implementation of the ninth aspect, the processor is configured to learn of the mapping relationship in the following manner:

receiving the mapping relationship from a roadside apparatus by using the transceiver;

obtaining the mapping relationship that is pre-configured; or obtaining a map from a server, and the mapping relationship included in the map.

With reference to the ninth aspect, in a possible implementation of the ninth aspect, the transceiver is further configured to receive the information about the first road from the roadside apparatus; or the processor is further configured to obtain a map from a server, and the information about the first road included in the map.

With reference to the ninth aspect, in a possible implementation of the ninth aspect, the processor is configured to check, in the following manner, whether the first vehicle is allowed to use the on-board function on the first road:

checking a first check sequence to obtain the check result.

When the check result indicates that the check on the first check sequence succeeds, the first vehicle is allowed to use the on-board function on the first road.

When the check result indicates that the check on the first check sequence fails, the first vehicle is not allowed to use the on-board function on the first road, and the first check sequence is a check sequence corresponding to the on-board function.

With reference to the ninth aspect, in a possible implementation of the ninth aspect, the processor is further configured to:

determine, based on the information about the first road, the on-board function that is allowed to be used by the first vehicle on the first road, and obtain the first check sequence corresponding to the on-board function; or determine the on-board function supported by the first vehicle, and obtain the first check sequence corresponding to the on-board function.

With reference to the ninth aspect, in a possible implementation of the ninth aspect, the processor is configured to obtain, in the following manner, the first check sequence corresponding to the on-board function:

calculating the first check sequence based on an identifier of the on-board function;

receiving, by using the transceiver, the first check sequence that is from the roadside apparatus and that corresponds to the on-board function; or sending, by using the transceiver, an identifier of the on-board function to the roadside apparatus, and receiving the first check sequence from the roadside apparatus.

With reference to the ninth aspect, in a possible implementation of the ninth aspect, the processor is configured to calculate the first check sequence based on the identifier of the on-board function in the following manner:

calculating the first check sequence based on the identifier of the on-board function;

calculating the first check sequence based on the identifier of the on-board function and a random sequence;

calculating the first check sequence based on the identifier of the on-board function and an identifier of the roadside apparatus; or calculating the first check sequence based on the identifier of the on-board function, a random sequence, and an identifier of the roadside apparatus.

With reference to the ninth aspect, in a possible implementation of the ninth aspect, the information about the first road includes one or any combination of the following:
- a type of the first road,
- a geographical range of the first road,
- track information of the first road,
- an identifier of the first road,
- an identity of a lane on the first road, or
- an effective time period corresponding to the first road, where the type of the first road is effective within the effective time period.

For technical effects of the ninth aspect or the possible implementations of the ninth aspect, refer to the description of the technical effects of the first aspect or the possible implementations of the first aspect.

According to a tenth aspect, a communications apparatus is provided. The communications apparatus is, for example, the second communications apparatus described above. The communications apparatus includes a processor and a transceiver. The processor and the transceiver are configured to implement the method described in the second aspect or the possible designs of the second aspect. For example, the communications apparatus is a chip disposed in a communications device. For example, the transceiver is implemented by using an antenna, a feeder, a codec, and the like in the communications device. Alternatively, if the communications apparatus is the chip disposed in the communications device, the transceiver is, for example, a communications interface in the chip. The communications interface is connected to a radio frequency transceiver component in the communications device, to receive and send information by using the radio frequency transceiver component. For example, the communications apparatus is a roadside apparatus. The transceiver is configured to receive an identifier of an on-board function from an in-vehicle apparatus.

The processor is configured to determine whether a vehicle is allowed to use the on-board function on a first road.

The transceiver is further configured to send first information to the in-vehicle apparatus.

With reference to the tenth aspect, in a possible implementation of the tenth aspect, the first information is used to indicate whether the vehicle is allowed to use the on-board function on the first road.

With reference to the tenth aspect, in a possible implementation of the tenth aspect, the processor determines that the vehicle is allowed to use the on-board function on the first road, and the transceiver is configured to send the first information to the in-vehicle apparatus in the following manner: sending a first check sequence corresponding to the on-board function to the in-vehicle apparatus.

With reference to the tenth aspect, in a possible implementation of the tenth aspect, the processor is configured to obtain, in the following manner, the first check sequence corresponding to the on-board function:
- calculating the first check sequence based on the identifier of the on-board function;
- calculating the first check sequence based on the identifier of the on-board function and a random sequence;
- calculating the first check sequence based on the identifier of the on-board function and an identifier of the roadside apparatus; or
- calculating the first check sequence based on the identifier of the on-board function, a random sequence, and an identifier of the roadside apparatus.

With reference to the tenth aspect, in a possible implementation of the tenth aspect, the processor determines that the vehicle is not allowed to use the on-board function on the first road, and the transceiver is configured to send the first information to the in-vehicle apparatus in the following manner: sending indication information to the in-vehicle apparatus. The indication information is used to indicate a request failure, or a reason why the vehicle is not allowed to use the on-board function on the first road.

With reference to the tenth aspect, in a possible implementation of the tenth aspect, the transceiver is further configured to send information about the first road to the in-vehicle apparatus. The information about the first road is used to determine the on-board function that is allowed to be used by the vehicle on the first road.

With reference to the tenth aspect, in a possible implementation of the tenth aspect, the information about the first road includes one or any combination of the following:
- a type of the first road,
- a geographical range of the first road,
- track information of the first road,
- an identifier of the first road,
- an identity of a lane on the first road, or
- an effective time period corresponding to the first road, where the type of the first road is effective within the effective time period.

For technical effects of the tenth aspect or the possible implementations of the tenth aspect, refer to the description of the technical effects of the second aspect or the possible implementations of the second aspect.

According to an eleventh aspect, a communications apparatus is provided. The communications apparatus is, for example, the third communications apparatus described above. The communications apparatus includes a processor and a transceiver. The processor and the transceiver are configured to implement the method described in the third aspect or the possible designs of the third aspect. For example, the communications apparatus is a chip disposed in a communications device. For example, the transceiver is implemented by using an antenna, a feeder, a codec, and the like in the communications device. Alternatively, if the communications apparatus is the chip disposed in the communications device, the transceiver is, for example, a communications interface in the chip. The communications interface is connected to a radio frequency transceiver component in the communications device, to receive and send information by using the radio frequency transceiver component. For example, the communications apparatus is an in-vehicle apparatus. The transceiver is configured to receive information about a first road.

The processor is configured to determine, based on a mapping relationship between information about a road and a vehicle function and the information about the first road, a function that is allowed to be used by a first vehicle on the first road. The first vehicle carries the in-vehicle apparatus.

With reference to the eleventh aspect, in a possible implementation of the eleventh aspect,
the processor is further configured to enable an on-board function. The on-board function is the function that is allowed to be used by the first vehicle on the first road, or a function that is not allowed to be used by the first vehicle on the first road.

The transceiver is further configured to send state information. The state information is used to indicate that the first vehicle enables the on-board function.

With reference to the eleventh aspect, in a possible implementation of the eleventh aspect, the information about the first road includes one or any combination of the following:
- a type of the first road,
- a geographical range of the first road,
- track information of the first road,
- an identifier of the first road,
- an identity of a lane on the first road, or
- an effective time period corresponding to the first road, where the type of the first road is effective within the effective time period.

For technical effects of the eleventh aspect or the possible implementations of the eleventh aspect, refer to descriptions of technical effects of the third aspect or the possible implementations of the third aspect.

According to a twelfth aspect, a communications apparatus is provided. The communications apparatus is, for example, the fourth communications apparatus described above. The communications apparatus includes a processor and a transceiver. The processor and the transceiver are configured to implement the method described in the fourth aspect or the possible designs of the fourth aspect. For example, the communications apparatus is a chip disposed in a communications device. For example, the transceiver is implemented by using an antenna, a feeder, a codec, and the like in the communications device. Alternatively, if the communications apparatus is the chip disposed in the communications device, the transceiver is, for example, a communications interface in the chip. The communications interface is connected to a radio frequency transceiver component in the communications device, to receive and send information by using the radio frequency transceiver component. For example, the communications apparatus is a roadside apparatus. The transceiver is configured to receive state information from an in-vehicle apparatus. The state information is used to indicate that a first vehicle that carries the in-vehicle apparatus enables an on-board function.

The processor is configured to determine whether a vehicle is allowed to use the on-board function on a first road.

The processor is further configured to: when the vehicle is not allowed to use the on-board function on the first road, record an event that the first vehicle enables the on-board function as a violation event.

With reference to the twelfth aspect, in a possible implementation of the twelfth aspect, the processor is configured to determine, in the following manner, whether the vehicle is allowed to use the on-board function on the first road:
determining, based on a mapping relationship between information about a road and a vehicle function, whether the on-board function corresponds to the first road. When the on-board function corresponds to the first road, the vehicle is allowed to use the on-board function on the first road. Otherwise, the vehicle is not allowed to use the on-board function on the first road.

For technical effects of the twelfth aspect or the possible implementations of the twelfth aspect, refer to the description of the technical effects of the fourth aspect or the possible implementations of the fourth aspect.

According to a thirteenth aspect, a communications apparatus is provided. The communications apparatus may be the first communications apparatus in the foregoing method designs. For example, the communications apparatus is a chip disposed in a communications device. For example, the communications device is an in-vehicle apparatus. The communications apparatus includes: a memory, configured to store computer-executable program code; and a processor. The processor is coupled to the memory. The program code stored in the memory includes an instruction. When the processor executes the instruction, the communications apparatus is enabled to perform the method in any one of the first aspect or the possible implementations of the first aspect.

The communications apparatus may further include a communications interface. The communications interface may be a transceiver in the in-vehicle apparatus. For example, the transceiver is implemented by using an antenna, a feeder, a codec, and the like in the communications apparatus. Alternatively, if the communications apparatus is a chip disposed in the in-vehicle apparatus, the communications interface may be an input/output interface of the chip, for example, an input/output pin.

According to a fourteenth aspect, a communications apparatus is provided. The communications apparatus may be the second communications apparatus in the foregoing method designs. For example, the communications apparatus is a chip disposed in a communications device. For example, the communications device is a roadside apparatus. The communications apparatus includes: a memory, configured to store computer-executable program code; and a processor. The processor is coupled to the memory. The program code stored in the memory includes an instruction. When the processor executes the instruction, the communications apparatus is enabled to perform the method in any one of the second aspect or the possible implementations of the second aspect.

The communications apparatus may further include a communications interface. The communications interface may be a transceiver in the roadside apparatus. For example, the transceiver is implemented by using an antenna, a feeder, a codec, and the like in the communications apparatus. Alternatively, if the communications apparatus is a chip disposed in the roadside apparatus, the communications interface may be an input/output interface of the chip, for example, an input/output pin.

According to a fifteenth aspect, a communications apparatus is provided. The communications apparatus may be the third communications apparatus in the foregoing method designs. For example, the communications apparatus is a chip disposed in a communications device. For example, the communications device is an in-vehicle apparatus. The communications apparatus includes: a memory, configured to store computer-executable program code; and a processor. The processor is coupled to the memory. The program code stored in the memory includes an instruction. When the processor executes the instruction, the communications apparatus is enabled to perform the method in any one of the third aspect or the possible implementations of the third aspect.

The communications apparatus may further include a communications interface. The communications interface may be a transceiver in the in-vehicle apparatus. For example, the transceiver is implemented by using an antenna, a feeder, a codec, and the like in the communications apparatus. Alternatively, if the communications apparatus is a chip disposed in the in-vehicle apparatus, the communications interface may be an input/output interface of the chip, for example, an input/output pin.

According to a sixteenth aspect, a communications apparatus is provided. The communications apparatus may be the fourth communications apparatus in the foregoing method designs. For example, the communications apparatus is a chip disposed in a communications device. For example, the communications device is a roadside apparatus. The communications apparatus includes: a memory, configured to store computer-executable program code; and a processor. The processor is coupled to the memory. The program code stored in the memory includes an instruction. When the processor executes the instruction, the communications apparatus is enabled to perform the method in any one of the fourth aspect or the possible implementations of the fourth aspect.

The communications apparatus may further include a communications interface. The communications interface may be a transceiver in the roadside apparatus. For example, the transceiver is implemented by using an antenna, a feeder, a codec, and the like in the communications apparatus. Alternatively, if the communications apparatus is a chip disposed in the roadside apparatus, the communications interface may be an input/output interface of the chip, for example, an input/output pin.

According to a seventeenth aspect, a communications system is provided. The communications system may include the communications apparatus according to the fifth aspect, the communications apparatus according to the ninth aspect, or the communications apparatus according to the thirteenth aspect, and the communications apparatus according to the sixth aspect, the communications apparatus according to the tenth aspect, or the communications apparatus according to the fourteenth aspect.

According to an eighteenth aspect, a communications system is provided. The communications system may include the communications apparatus according to the seventh aspect, the communications apparatus according to the eleventh aspect, or the communications apparatus according to the fifteenth aspect, and the communications apparatus according to the eighth aspect, the communications apparatus according to the twelfth aspect, or the communications apparatus according to the sixteenth aspect.

The communications system provided in the seventeenth aspect and the communications system provided in the eighteenth aspect may be a same communications system, or may be different communications systems.

According to a nineteenth aspect, a computer storage medium is provided. The computer-readable storage medium stores an instruction. When the instruction is run on a computer, the computer is enabled to perform the method in any one of the first aspect or the possible designs of the first aspect.

According to a twentieth aspect, a computer storage medium is provided. The computer-readable storage medium stores an instruction. When the instruction is run on a computer, the computer is enabled to perform the method in any one of the second aspect or the possible designs of the second aspect.

According to a twenty-first aspect, a computer storage medium is provided. The computer-readable storage medium stores an instruction. When the instruction is run on a computer, the computer is enabled to perform the method in any one of the third aspect or the possible designs of the third aspect.

According to a twenty-second aspect, a computer storage medium is provided. The computer-readable storage medium stores an instruction. When the instruction is run on a computer, the computer is enabled to perform the method in any one of the fourth aspect or the possible designs of the fourth aspect.

According to a twenty-third aspect, a computer program product including an instruction is provided. The computer program product stores the instruction. When the computer program product runs on a computer, the computer is enabled to perform the method in any one of the first aspect or the possible designs of the first aspect.

According to a twenty-fourth aspect, a computer program product including an instruction is provided. The computer program product stores the instruction. When the computer program product runs on a computer, the computer is enabled to perform the method in any one of the second aspect or the possible designs of the second aspect.

According to a twenty-fifth aspect, a computer program product including an instruction is provided. The computer program product stores the instruction. When the computer program product runs on a computer, the computer is enabled to perform the method in any one of the third aspect or the possible designs of the third aspect.

According to a twenty-sixth aspect, a computer program product including an instruction is provided. The computer program product stores the instruction. When the computer program product runs on a computer, the computer is enabled to perform the method in any one of the fourth aspect or the possible designs of the fourth aspect.

In the embodiments of this disclosure, whether to enable a corresponding on-board function may be controlled, so that the on-board function is enabled without depending on a human requirement. In this way, the corresponding on-board function may be controlled to be applied to an appropriate road, to reduce a vehicle accident risk, and a danger to social security.

DESCRIPTION OF EMBODIMENTS

Figure 1:
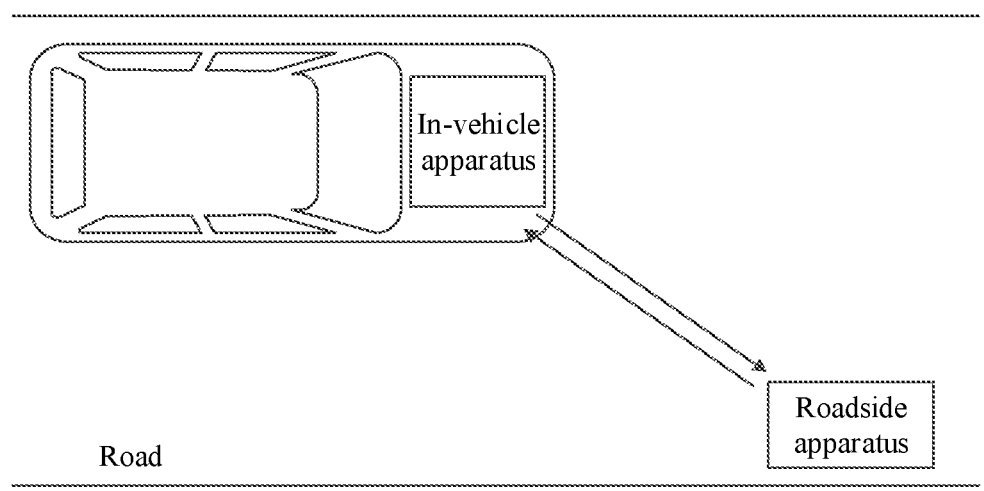
FIG. 1 is a schematic diagram of an disclosure scenario according to an embodiment of this disclosure.

To make the objectives, technical solutions and advantages of embodiments of this disclosure clearer, the following description further describes the embodiments of this disclosure in detail with reference to the accompanying drawings.

1. On-board unit: An on-board unit (OBU) is usually installed on a vehicle. In an ETC system, a roadside unit (RSU) is disposed on a roadside. The OBU may communicate with the RSU. For example, the OBU may communicate with the RSU through a microwave. When the vehicle passes by the RSU, the OBU and the RSU may communicate with each other through the microwave. In the electronic toll collection (ETC) system, the OBU establishes a microwave communications link with the RSU by using a dedicated short-range communications (DSRC) technology, to implement processes, such as, vehicle identity recognition or electronic fee deduction on a travel of the vehicle without stopping the vehicle.

Alternatively, if various terminal devices described below are located in the vehicle (for example, disposed or installed in the vehicle), the terminal devices may be considered as in-vehicle terminal devices. The in-vehicle terminal devices may also be considered as OBUs.

A terminal device may be a device that provides a user with voice and/or data connectivity, for example, a handheld device with a wireless connection function, or a processing device connected to a wireless modem. The terminal device may communicate with a core network through a radio access network (RAN), and exchange voice and/or data with the RAN. The terminal device may include user equipment (UE), a wireless terminal device, a mobile terminal device, a device-to-device (D2D) communications terminal device, a V2X terminal device, a machine-to-machine/machine-type communications (M2M/MTC) terminal device, an internet of things (IoT) terminal device, a subscriber unit (subscriber unit), a subscriber station, a mobile station, a remote station, an access point (AP), a remote terminal, an access terminal, a user terminal, a user agent, a user device, or the like. For example, the terminal device may include a mobile phone (or referred to as a "cellular" phone), a computer with a mobile terminal device, a portable, pocket-sized, hand-held, or computer built-in mobile apparatus, or the like. For example, the terminal device may be a device, for example, a personal communications service (PCS) phone, a cordless telephone set, a session initiation protocol (SIP) phone, a wireless local loop (WLL) station, or a personal digital assistant (PDA). The terminal device further includes a limited device, for example, a device with low power consumption, a device with a limited storage capability, or a device with a limited compute capability. For example, the terminal device may be an information sensing device, for example, a barcode, radio frequency identification (RFID), a sensor, a global positioning system (GPS), or a laser scanner.

As an example, instead of a limitation, in the embodiments of this disclosure, the terminal device may alternatively be a wearable device. The wearable device may also be referred to as a wearable intelligent device, an intelligent wearable device, or the like, and is a generic term for wearable devices that are developed by applying wearable technologies to intelligently design daily wear, such as glasses, gloves, watches, clothes, and shoes. The wearable device is a portable device that is directly worn on a body or integrated into clothes or an accessory of a user. The wearable device is a hardware device, and implements a powerful function based on software support, data interaction, and cloud interaction. In a broader sense, the wearable intelligent device is full-featured, has a large size, and can implement all or some functions without depending on a smartphone. For example, the wearable intelligent device is a smart watch or smart glasses. Alternatively, the wearable intelligent device focuses only on a specific application or function and needs to be used with another device, for example, a smartphone. For example, the wearable intelligent device is a smart wristband, a smart helmet, or smart jewelry for physical sign monitoring.

2. RSU: An RSU may be a fixed infrastructure entity that supports a vehicle-to-everything (V2X) application, and may exchange a message with another entity that supports the V2X application.

3. The terms "system" and "network" may be used interchangeably in the embodiments of this disclosure. "At least one" indicates one or more, and "a plurality of" indicates two or more. "And/Or" describes an association relationship for associated objects and represents that three relationships may exist. For example, A and/or B may represent the following cases: Only A exists, both A and B exist, and only B exists, where A and B may be singular or plural. The character "/" usually indicates an "or" relationship between the associated objects. "At least one piece (item) of the following" or a similar expression thereof indicates any combination of these items, including any combination of a singular item (piece) or plural items (pieces). For example, at least one item (piece) of a, b, or c may indicate: a, b, c, a and b, a and c, b and c, or a, b, and c, where a, b, and c may be singular or plural.

In addition, unless otherwise specified, ordinal numbers such as "first" and "second" mentioned in the embodiments of this disclosure are used to distinguish between a plurality of objects, and are not used to limit a sequence, a time sequence, a priority, or an importance degree of the plurality of objects. For example, a first road and a second road are merely intended to distinguish between different roads, but do not indicate that the two roads have different priorities, different importance degrees, or the like.

The foregoing describes some concepts in the embodiments of this disclosure. The following describes technical features in the embodiments of this disclosure.

As self-driving technologies are developing rapidly, currently, driving automation levels of a vehicle may be classified into an L 0 to an L 5, from no-driving automation to full-driving automation.

Driving automation L 0 (the non-driving automation): An automated driving system of the vehicle cannot continuously control horizontal motion or vertical motion in a dynamic driving task, or does not have a capability of detecting and responding to a target and an event that adapt to the horizontal motion control or the vertical motion control. The horizontal motion control of the vehicle includes, for example, controlling a steering wheel. The vertical motion control of the vehicle includes, for example, controlling a brake.

Driving automation L 1 (driving assistance): The automated driving system of the vehicle continuously controls the horizontal motion or the vertical motion in the dynamic driving task within a designed running range, and has the capability of detecting and responding to the target and the event that adapt to the horizontal motion control or the vertical motion control. In the driving automation L1, a working condition in which the automated driving system can control the horizontal motion or the vertical motion about the vehicle is specified. For example, the horizontal motion or the vertical motion about the vehicle cannot be controlled on a road with a school.

Driving automation L 2 (partial driving automation): The automated driving system of the vehicle continuously controls the horizontal motion or the vertical motion in the dynamic driving task within the designed running range, and has the capability of detecting and responding to the target and the event that adapt to the horizontal motion control or the vertical motion control. In the driving automation L 2, in addition to controlling the horizontal motion and the vertical motion, a driver needs to execute another dynamic driving task, monitors behavior of the automated driving system, and performs an appropriate response or operation.

Driving automation L 3 (conditional driving automation): The automated driving system of the vehicle continuously executes all dynamic driving tasks within the designed running range. In the driving automation L 3, the user in the vehicle does not need to monitor the behavior of the automated driving system. However, if the automated driving system sends an intervention request, or the automated driving system fails or has an error, the user needs to take over the vehicle in an appropriate manner, to achieve a state with a minimum risk.

Driving automation L 4 (high-level driving automation): The automated driving system continuously executes all the dynamic driving tasks within the designed running range. In the driving automation L 4, the user in the vehicle is a passenger, and does not need to monitor the behavior of the automated driving system. Even if the automated driving system sends the intervention request, or the like, the user does not need to give a response. The automated driving system can automatically achieve the state with the minimum risk.

Driving automation L 5 (the full driving automation): The automated driving system can continuously execute all the dynamic driving tasks under any driving condition. In the driving automation L 5, the user in the vehicle is the passenger, and does not need to monitor the behavior of the automated driving system. Even if the automated driving system sends the intervention request, or the like, the user does not need to give the response. The automated driving system can automatically achieve the state with the minimum risk. The automated driving system in the L 5 has no limitation on the designed running range (excluding factors such as commercial and regulatory factors). In principle, the automated driving system can perform operations that can be processed by a skilled conventional driver under all conditions.

It can be learned that as a self-driving level is improved, an automation degree of the vehicle is gradually improved, and a participation degree of the driver can also be gradually reduced.

Currently, all regions around the world are actively carrying out self-driving vehicle related activities, such as an actual road test or actual road driving. The vehicles are actually driving in an open environment, to improve or verify self-driving capabilities.

There may be a plurality of types of self-driving functions, such as, a high-speed automatic cruise function, or a vehicle automatic lane change function. Different self-driving functions have different dangers. Some self-driving functions have comparatively high dangers, and some self-driving functions may have comparatively low dangers. If a self-driving vehicle moves on a road with a complex environment and enables a self-driving function with a high danger, an accident is likely to occur. For example, if the self-driving vehicle moves on a road with a school or a hospital and enables an automatic lane change function, an accident risk may increase due to a large number of pedestrians on the road. Therefore, to ensure public safety, a government usually specifies a road on which the self-driving function can be used. In other words, the vehicle can enable the self-driving function only on specified roads. In principle, the self-driving function is not allowed to be used on a road on which the self-driving function is not specified to be used.

However, enablement of the self-driving function is currently determined manually, and is not controlled externally. Therefore, the self-driving function may be manually enabled even on the road on which the self-driving function is not specified to be used. In the event someone maliciously (or even if the driver inadvertently) enables the self-driving function on a road that is inappropriate for the self-driving function, a vehicle accident may occur, which can result in great harm any physical injury.

In view of this, the technical solutions in the embodiments of this disclosure are provided. In the embodiments of this disclosure, if an in-vehicle apparatus triggers an on-board function, the in-vehicle apparatus needs to check the on-board function, and enables or disables the on-board function based on a check result. For example, if the check fails, a first vehicle is not allowed to use the on-board function on a first road, and the in-vehicle apparatus may disable the on-board function. Whether to enable a corresponding on-board function is controlled, so that the on-board function is enabled without depending on a human requirement. In this way, the corresponding on-board function may be controlled to be applied to an appropriate road, to reduce a vehicle accident risk, and a danger to social security. The on-board function is, for example, a self-driving function, or may be another vehicle function. One vehicle may have one or more on-board functions. The on-board function described herein may be an on-board function of the first vehicle.

The following describes a network architecture to which an embodiment of this disclosure is applied. FIG. 1 shows the network architecture to which the embodiment of this disclosure is applied.

FIG. 1 includes an in-vehicle apparatus and a roadside apparatus that may communicate with each other. For example, the in-vehicle apparatus and the roadside apparatus may communicate with each other through microwave, or by using another technology. The in-vehicle apparatus is carried on a vehicle. For example, one vehicle carries one or more in-vehicle apparatuses. In FIG. 1, one in-vehicle apparatus and one roadside apparatus are used as an example. The vehicle carrying the in-vehicle apparatus is driven on a road, and the roadside apparatus is, for example, located on a road side. Actually, one in-vehicle apparatus may communicate with a plurality of roadside apparatuses. One roadside apparatus may also communicate with a plurality of in-vehicle apparatuses. In addition, a position of the in-vehicle apparatus on the vehicle, an installation position of the roadside apparatus, and the like are merely examples, and do not necessarily represent actual positions.

The in-vehicle apparatus in FIG. 1 is, for example, an OBU, and the roadside apparatus is, for example, an RSU.

The following describes the technical solutions in the embodiments of this disclosure with reference to the accompanying drawings. In the embodiments of this disclosure, the "function", the "vehicle function", and the "on-board function" may be a same concept. The on-board function may include a function of an OBU, a vehicle function, or include a vehicle function and a function of an OBU. In the following description, an example in which the on-board function includes the vehicle function is mainly used. An actual situation is not limited hereto.

Figure 2:
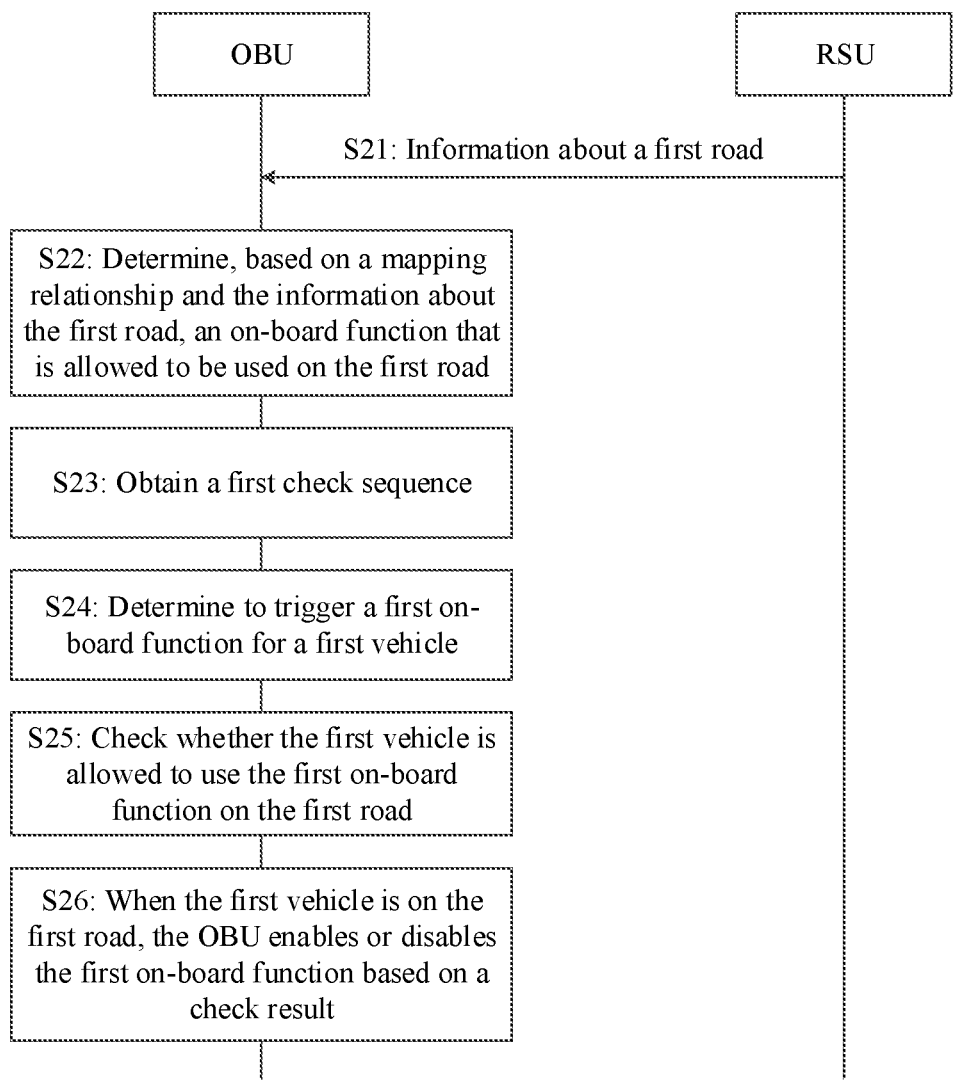
FIG. 2 is a flowchart of a first communication method according to an embodiment of this disclosure.

An embodiment of this disclosure provides a first communication method. FIG. 2 is a flowchart of the method. In the following description process, an example in which the method is applied to the network architecture shown in FIG. 1 is used. In addition, the method may be performed by two communications apparatuses. For example, the two communications apparatuses are a first communications apparatus and a second communications apparatus. The first communications apparatus or the second communications apparatus may be an in-vehicle apparatus or a communications apparatus (for example, a chip system) that can support an in-vehicle apparatus in implementing a function required in the method, a roadside apparatus or a communications apparatus (for example, a chip system) that can support a roadside apparatus in implementing a function required in the method, or another communications apparatus. In addition, implementations of the first communications apparatus and the second communications apparatus are not limited. For example, the two communications apparatuses may be implemented in a same form. For example, the two communications apparatuses are implemented in a form of a device. Alternatively, the two communications apparatuses may be implemented in different forms. For example, the first communications apparatus is implemented in a form of a device, and the second communications apparatus is implemented in a manner of a chip system, or the like.

For ease of description, the following uses an example in which the method is performed by an in-vehicle apparatus and a roadside apparatus, namely, an example in which the first communications apparatus is the in-vehicle apparatus and the second communications apparatus is the roadside apparatus. The example in which this embodiment is applied to the network architecture shown in FIG. 1 is used. Therefore, the in-vehicle apparatus described below may be the in-vehicle device in the network architecture shown in FIG. 1, and the roadside apparatus described below may be the roadside apparatus 1 in the network architecture shown in FIG. 1. For ease of understanding, in the following description process, an example in which the in-vehicle apparatus is an OBU and the roadside apparatus is an RSU is used.

S21: The RSU sends information about a first road to the OBU, and the OBU receives the information about the first road from the RSU.

For example, the RSU may send configuration information to the OBU. The configuration information may include information about at least one road. If a quantity of the at least one road is 1, the RSU sends the information about the first road to the OBU. If the quantity of the at least one road is greater than 1, the RSU sends information about a plurality of roads to the OBU. The plurality of roads may include the first road.

The RSU is disposed on a road side. Therefore, the RSU may obtain information about one or more roads. For example, the RSU may obtain information about a road on which the RSU is located, or information about a road around a road on which the RSU is located. For example, a road 1 and a road 2 are intersected. If the RSU is located on the road 1 and at a crossroad at which the road 1 and the road 2 are intersected, the RSU may obtain information about the road 1, and information about the road 2.

Information about one road may include one or any combination of the following: a type of the road, an identifier of the road, an area range (also be referred to as a geographical range) of the road, track information of the road, a number of a lane corresponding to the road, information about the RSU that sends the information about the road to the OBU, or an effective time period corresponding to the road. The effective time period of the road may indicate that the type of the road is effective within the effective time period. Therefore, the effective time period corresponding to the road may be understood as the effective time period corresponding to the type of the road. For example, the information about the road includes the type of the road, the information about the road includes the type of the road and the identifier of the road, the information about the road includes the type of the road, the identifier of the road, the area range of the road, and the track information of the road, the information about the road includes the identifier of the road, the area range of the road, the track information of the road, the effective time period of the road, or the like. For example, for the first road, the information about the first road may include one or any combination of the following: a type of the first road, an identifier of the first road, a geographical range of the first road, track information of the first road, a number of a lane corresponding to the first road, the information about the RSU (namely, information about the RSU in the step S21) that sends the information about the first road to the OBU, or an effective time period corresponding to the first road.

For example, roads may be classified into different types based on one or any combination of the following plurality of factors: road complexity, road mark definition, a road administrative level, a road technical level, population density, a traffic volume, a weather condition, or a road emergency. For example, the roads may be classified into the different types based on the road complexity, the roads may be classified into the different types based on the road mark definition and the road technical level, the roads may be classified into the different types based on the road technical level, the population density, and the traffic volume, the roads may be classified into the different types based on the road complexity, the road mark definition, the population density, and the weather condition, the roads may be classified into the different types based on the road complexity, the road mark definition, the road administrative level, the road technical level, the population density, the traffic volume, the weather condition, and the road emergency, or the like.

For example, if there is a rotary island, an urgent curved road turn, or the like on a road, the road complexity is comparatively high, and the road may be classified as a type of road. If a road is comparatively straight and has no curved road turn, a comparatively gentle curved road turn, or the like, the road complexity is comparatively low, and the road may be classified as another type of road. The road administrative level includes, for example, a high-speed road, a national road, or a provincial road. For example, the high-speed road may be classified as a type of road, the national road may be classified as another type of road, and the provincial road may be classified as still another type of road. The road technical level includes, for example, a first-level road or a second-level road. For example, the first-level road may be classified as a type of road, and the second-level road may be classified as another type of road. The road emergency includes, for example, road repair or an accident. For example, a road on which the road repair and/or the traffic accident occur/occurs may be classified as a type of road, and a road on which the road repair and the traffic accident do not occur is classified as another type of road.

The type of the road may not always be the same. For example, the RSU may set a type for the road, and periodically update the type of the road. Alternatively, the RSU may irregularly update the type of the road. For example, the RSU may update the type of the road when a road condition changes. For example, when the RSU updates a type of one road in a period, and the road is being maintained, the RSU sets the type of the road as a type 1. However, when the RSU updates the type of the road in a next period, the road is stopped being maintained, and the road can be normally used, the RSU may update the type of the road to a type 2.

The identifier of the road includes, for example, a name of the road, an identity number (ID) of the road, or a name of the road and an ID of the road. Certainly, the identifier of the road may further include other information that can uniquely identify the road.

The geographical range of the road may be used to indicate a geographical position of the road. For example, the geographical range of the road may include a start position and an end position of the road.

The track information of the road may be used to describe a shape of the road. For example, the track information of the road includes a track point sequence of the road.

The road corresponding to the information about the road may be a lane on an avenue, or a complete road. If the road is the lane on the avenue, the information about the road may include a number of the lane. If the road is the complete road, the information about the road may not include a number of the lane. For example, if the information about the road 1 includes the type 1 and a number 1 of a lane on the road 1, it indicates that a type of the lane whose number is 1 on the road 1 is the type 1, but a type of another lane on the road 1 is not indicated. Alternatively, for example, if the information about the road 1 includes the type 1 and an ID of the road 1, it indicates that a type of the road 1 is the type 1.

The effective time period of the road indicates that the type of the road within the effective time period is a current type. Beyond the effective time period, the type of the road may be the current type, or may not be the current type. The effective time period may include one or more time periods. If the effective time period includes a plurality of time periods, the plurality of time periods may be consecutive or inconsecutive in terms of time.

In an optional manner, the configuration information may further include one or more random sequences. For example, the information about the at least one road one-to-one correspond to a random sequence, one random sequence corresponds to information about one road, or the information about the at least one road corresponds to only one random sequence. The random sequence may be a separate sequence, for example, a 128-bit binary sequence, or a 256-bit binary sequence. Alternatively, the random sequence may be a combination of a plurality of sequences, for example, a sequence obtained through head-to-tail splicing the plurality of sequences.

For example, the RSU may send the configuration information in a broadcast manner. The OBU may receive a broadcast message from the RSU, to obtain the configuration information. The RSU may further send the configuration information in a multicast manner. The OBU may receive a multicast message from the RSU, to obtain the configuration information. Alternatively, the RSU may send the configuration information in a unicast manner. The OBU may receive a unicast message from the RSU, to obtain the configuration information. If the RSU sends the configuration information in the broadcast manner or the multicast manner, there may be a plurality of OBUs that can receive the configuration information. Processing manners after the plurality of OBUs receive the configuration information may be similar. Therefore, only one of the OBUs is used as an example for description in the embodiment shown in FIG. 2.

In addition, one OBU may receive configuration information from only one RSU, or configuration information from a plurality of RSUs. It may be considered that the information about the at least one road in the step S21 may be indicated by one or more pieces of configuration information. If configuration information sent by two RSUs indicates a same road (or a same lane on a same road), during processing, the OBU needs to perform processing only according to indication of configuration information from one of the RSUs. The OBU may ignore information that is about the road (or the lane of the road) and that is indicated by configuration information from another RSU. Alternatively, during processing, the OBU may not need to consider whether different configuration information indicates a same road or a same lane, and perform processing based on each piece of configuration information. The OBU also performs the processing even though the different configuration information indicates the same road or the same lane.

In addition, an example in which the OBU obtains the information about the at least one road from the RSU is used in the step S21. Alternatively, the OBU may obtain the information about the at least one road in another manner. For example, the OBU may obtain a map from a server. The map includes the information about the at least one road. The OBU may obtain the information about the at least one road included in the map.

S22: The OBU determines, based on a mapping relationship and the information about the first road, an on-board function that is allowed to be used on the first road. The mapping relationship includes a mapping relationship between information about a road and a vehicle function.

For example, the OBU may determine, based on the mapping relationship between the information about the road and the vehicle function, and the information about the at least one road, an on-board function that is allowed to be used on the at least one road. The OBU may determine an on-board function that is allowed to be used on each of the at least one road. When the OBU determines on-board functions that are allowed to be used on different roads, determining manners used are similar. Therefore, in the step S22, only an example in which the OBU determines the on-board function that is allowed to be used on the first road is used. A quantity of on-board functions that are allowed to be used on the first road may be 1, greater than 1, or 0.

The mapping relationship is learned of by the OBU. For example, the OBU stores the mapping relationship, or pre-stores the mapping relationship. For example, the mapping relationship may be pre-configured in the OBU. Further, the mapping relationship may be set by the RSU. After the setting, the RSU may send the mapping relationship to the OBU, and the OBU may receive the mapping relationship. The mapping relationship may further be specified in a protocol. Alternatively, the mapping relationship may be stored on a cloud platform. The OBU may obtain the mapping relationship from the cloud platform, and the OBU may further obtain the mapping relationship over a network.

Alternatively, the OBU may obtain a map from a server. The map includes the mapping relationship. The OBU may obtain the mapping relationship included in the map.

The OBU learns of the mapping relationship in different manners. For example, the mapping relationship may be in a form of a table. In the table, information about one road may correspond to one or more functions. Alternatively, the mapping relationship may be in a form of a bitmap. The bitmap includes a plurality of bits. A bit included in the bitmap one-to-one correspond to the vehicle function. In other words, one bit included in the bitmap is used to indicate one vehicle function. Information about each road may correspond to one bitmap. Quantities of bits in bitmaps corresponding to information about different roads may be the same. Correspondences between bits and functions of the vehicle may also be the same. For example, for a bitmap corresponding to information about a road, if a value of a bit included in the bitmap is "1", a function corresponding to the bit is a function that is allowed to be used on the road corresponding to the information about the road, and if the value of the bit included in the bitmap is "0", the function corresponding to the bit is a function that is not allowed to be used on the road corresponding to the information about the road. Certainly, the mapping relationship may alternatively be in another form, for example, in a form of a list (not a table), provided that the mapping relationship can indicate the mapping relationship between the information about the road and the vehicle function. A form of the mapping relationship is not limited.

The vehicle may have a plurality of functions. A self-driving function of the vehicle is used as an example. The self-driving function may indicate a specific function. For example, the self-driving function includes functions such as automated valet parking, high-speed automatic cruise, congestion automatic cruise, automatic lane change, automatic platooning driving, or remote driving. The self-driving function may further indicate a basic self-driving capability. For example, a self-driving function 1 indicates that a binocular camera is supported, a self-driving function 2 indicates that a 32-wire laser radar is supported, and a self-driving function 3 indicates that V2X vehicle-road communication is supported. Alternatively, the self-driving function may indicate a working condition or a scenario that can be supported. For example, the working condition is classified into signal controller identification, intersection traffic, pedestrian avoidance, or driving on a rainy or snowy day. Each working condition may correspond to one self-driving function.

Alternatively, the self-driving function may correspond to one or more of a specific function, a basic self-driving capability, or a working condition. For example, the self-driving function corresponds to the specific function and the basic self-driving capability, the self-driving function corresponds to the specific function and the working condition, the self-driving function corresponds to the basic self-driving capability and the working condition, or the self-driving function corresponds to the specific function, the basic self-driving capability and the working condition. For example, a self-driving function 1 indicates an automatic valet parking function and a basic capability of supporting the binocular camera, a self-driving function 2 indicates a high-speed automatic cruise capability and a working condition of driving on the rainy or snowy day, a self-driving function 3 indicates a congestion automatic cruise capability and a basic capability of supporting the V2X vehicle-road communication, a self-driving function 4 indicates an automatic lane change capability, a basic capability of supporting the 32-line laser radar, and a working condition of the signal controller identification.

The mapping relationship between the information about the road and the vehicle function may indicate a function that can be used on a road of a type of information. Therefore, an on-board function that is allowed to be used on a road can be determined based on the mapping relationship. For example, the mapping relationship between the information about the road and the vehicle function may be a mapping relationship between an identifier of the road and an identifier of the vehicle function. The mapping relationship may be used to indicate a function corresponding to each road. An indication granularity is fine. For another example, the mapping relationship between the information about the road and the vehicle function may also be a mapping relationship between a type of the road and the vehicle function. The mapping relationship may be used to indicate a function corresponding to one type of road. In comparison with that the mapping relationship is used to indicate the function corresponding to each road, that the mapping relationship is used to indicate the function corresponding to one type of road can reduce information amount of the mapping relationship. An example in which the mapping relationship between the information about the road and the vehicle function is the mapping relationship between the type of the road and the vehicle function is used. Further, to reduce the information amount of the mapping relationship, the mapping relationship between the type of the road and the vehicle function may further be a mapping relationship between an identifier of the type of the road and an identifier of the vehicle function. The identifier of the vehicle function is, for example, an ID of the vehicle function, and the identifier of the vehicle function may indicate the function.

Refer to Table 1. Table 1 is an example of the mapping relationship. In the example, the mapping relationship is in a form of a table.

TABLE 1

|  | Type 1 | Type 2 | Type 3 | . . . | Type k |
|---|---|---|---|---|---|
| Function 1 | ✓ | ✓ | ✓ |  | ✓ |
| Function 2 | ✓ |  | ✓ |  | ✓ |
| Function 3 | ✓ | ✓ |  |  | ✓ |
| Function 4 |  | ✓ | ✓ |  |  |

In Table 1, a type k indicates that a type of a road is k. There is a mapping relationship between a function 1 and each of a type 1, a type 2, a type 3, and the type k. It indicates that the function 1 may be used if a type of a road is the type 1, the type 2, the type 3, or the type k. However, there is no mapping relationship between a function 2 and the type 2. If a type of a road is the type 2, the function 2 is not allowed to be used.

The OBU may determine, based on the information about the first road and the mapping relationship, the on-board function that is allowed to be used on the first road. There may be one or more on-board functions that are allowed to be used on the first road. The on-board function that is allowed to be used on the first road and that is determined by the OBU is actually an on-board function that is allowed to be used when a first vehicle moves on the first road. The first vehicle may be a vehicle corresponding to the OBU. For example, the first vehicle is a vehicle carrying the OBU, or a vehicle controlled by the OBU.

S23: The OBU obtains a first check sequence. For example, the OBU may obtain M check sequences. The first check sequence is one of the M check sequences, where M is a positive integer. The first check sequence corresponds to an on-board function of the first vehicle. For example, to avoid confusion, the on-board function may be referred to as a first on-board function.

For example, the OBU may determine that M on-board functions are used when the vehicle runs on the at least one road, and the OBU can obtain check sequences of the M on-board functions. In this case, only an on-board function that is allowed to be used on the at least one road has a corresponding check sequence, but for an on-board function that is not allowed to be used on the at least one road, the OBU does not obtain a corresponding check sequence. For example, the OBU determines the on-board function that is allowed to be used on the first road, and may obtain a check sequence corresponding to the on-board function that is allowed to be used on the first road. There may be one or more on-board functions that are allowed to be used on the first road. The OBU may obtain one or more check sequences. The one or more check sequences include the first check sequence. The first check sequence corresponds to the first on-board function that is allowed to be used on the first road.

Alternatively, the OBU may obtain M check sequences corresponding to M on-board functions supported by the first vehicle. The M on-board functions are all or some on-board functions supported by the first vehicle. In this case, the M on-board functions may include an on-board function that is allowed to be used on the at least one road, and an on-board function that is not allowed to be used on the at least one road. The OBU obtains check sequences corresponding to these on-board functions.

The OBU may obtain the M check sequences in different manners. Manners in which the OBU obtains the check sequences are similar. Therefore, the following uses an example in which the OBU obtains the first check sequence.

In an optional manner of obtaining the first check sequence by the OBU, the OBU may calculate the first check sequence by the OBU. For example, the OBU may calculate the first check sequence based on an identifier of the first on-board function. After determining that the first on-board function is the on-board function that is allowed to be used on the first road, the OBU may calculate the first check sequence. For example, the OBU determines, based on the information about the first road and the mapping relationship, the first on-board function that is allowed to be used by the first vehicle on the first road, and calculates the first check sequence. Alternatively, the OBU may not need to determine whether the first on-board function is the on-board function that is allowed to be used on the first road. For example, if the OBU determines that the first on-board function is an on-board function that can be supported by the OBU, the OBU may calculate the first check sequence. It may be understood that the M on-board functions are the on-board functions that are allowed to be used on the at least one road, or the M on-board functions may be all on-board functions supported by the first vehicle, or some on-board functions supported by the first vehicle.

The OBU may calculate one check sequence based on an identifier of one on-board function. It is equivalent to that an identifier of an on-board function one-to-one corresponds to a check sequence.

In an optional manner, if the OBU obtains the information about the first road from the RSU, for example, when calculating the check sequence, the OBU may consider an identifier of the RSU in addition to an identifier of a corresponding on-board function. For example, the OBU may calculate the first check sequence based on the identifier of the first on-board function and the identifier of the RSU corresponding to the on-board function. The identifier of the RSU is, for example, an ID of the RSU. The RSU corresponding to the first on-board function indicates the RSU that sends the information about the first road to the OBU. The first on-board function is a function that is allowed to be used on the first road.

The OBU may calculate a plurality of check sequences, for example, the OBU calculates the M check sequences, identifiers of the RSU used when the OBU calculates different check sequences may be the same, or different. For example, if two on-board functions are determined by the OBU based on configuration information from an RSU 1, when the OBU calculates check sequences of the two on-board functions, the OBU uses the same identifiers of the RSU, namely, identifier of the RSU 1. Alternatively, if one on-board function is determined by the OBU based on configuration information from an RSU 1, and another on-board function is determined by the OBU based on configuration information from an RSU 2, when calculating the check sequences of the two on-board functions, the OBU uses different identifiers of RSUs, namely, an identifier of the RSU 1 and an identifier of the RSU 2.

In still another optional manner, to improve reliability, when calculating the check sequence, the OBU may consider a random sequence in addition to the identifier of the on-board function. For example, the random sequence is included in the configuration information. If the OBU determines, based on one piece of configuration information, that one on-board function is a self-driving function that is allowed to be used on one road, and the configuration information includes the random sequence, the OBU may calculate the check sequence based on the identifier of the on-board function and the random sequence. For example, if the OBU determines, based on one piece of configuration information, that the first on-board function is a self-driving function that is allowed to be used on the first road, and the configuration information includes the random sequence, the OBU may calculate the first check sequence based on the identifier of the first on-board function and the random sequence. The configuration information may indicate the information about one or more roads. For example, regardless of information about a quantity of roads is indicated in the configuration information, the configuration information includes only one random sequence. In this case, when check sequences corresponding to on-board functions that are allowed to be used on roads corresponding to information about all the roads, indicated in the configuration information are calculated, the random sequence may be used. Alternatively, if the configuration information indicates information of a plurality of roads, the configuration information may include a plurality of random sequences, and the information about the roads one-to-one correspond to the random sequences, when the OBU calculates a check sequence corresponding to an on-board function that is allowed to be used on a road corresponding to information about the road, indicated in the configuration information, a random sequence corresponding to the on-board function may be used. The random sequence corresponding to the on-board function is a random sequence corresponding to a road on which the on-board function is allowed to be used.

In yet another optional manner, an example in which the OBU calculates the first check sequence is used. The OBU may calculate the first check sequence based on the identifier of the first on-board function, a random sequence corresponding to the first on-board function, and an identifier of the RSU corresponding to the first on-board function. In this way, information about the on-board function is considered, so that the check sequence corresponds to the on-board function. The identifier of the RSU and the random sequence are also considered. This improves check reliability.

For example, the OBU may enter input information (for example, the identifier of the first on-board function, the identifier of the first on-board function and the identifier of the RSU, the identifier of the first on-board function and the random sequence, or the identifier of the first on-board function, the random sequence, and the identifier of the RSU) into a first algorithm, and an output result is the first check sequence. For example, the first algorithm may be a mapping relationship between input information and a check sequence. After there is input information, a corresponding check sequence may be obtained based on the input information and the mapping relationship.

One OBU may receive configuration information from the plurality of RSUs. Different configuration information may indicate information about a same road. For example, two pieces of configuration information indicate information about the road 1. For example, that an on-board function 1 is allowed to be used on the road 1 is determined based on the mapping relationship between the information about the road and the vehicle function. If the OBU considers the identifier of the RSU or the random sequence when calculating the check sequence, the OBU may calculate based on the two pieces of configuration information, two check sequences corresponding to the on-board function 1. In a subsequent check process, either of the two check sequences is checked, and the check succeeds as long as the check succeeds. Alternatively, the two check sequences may be checked, and the check succeeds only when the check of both the two check sequences succeeds. In this case, because both of the two pieces of configuration information indicate the information about the road 1, the on-board function 1 is allowed to be used on the road 1. When the M on-board functions are determined, the on-board function 1 is determined twice. In other words, there are two same on-board functions in the M on-board functions, and the two same on-board functions are the on-board function 1. Therefore, two check sequences corresponding to the on-board function 1 are included in the M check sequences. Alternatively, after receiving the configuration information, the OBU may perform determination. If the different configuration information indicates the information about the same road, the OBU only needs to calculate, according to indication of one piece of the configuration information, the check sequence corresponding to the on-board function that is allowed to be used on the road. There is no need to calculate a check sequence corresponding to the on-board function that is allowed to be used on the road. The on-board function that is allowed to be used on the road is indicated in each piece of configuration information, to reduce a workload of the OBU. The subsequent check process is not affected. A check process mainly indicates checking, based on a check sequence, whether a corresponding on-board function is allowed to be enabled, and is described in the following.

In another optional manner in which the OBU obtains the M check sequences, the OBU does not need to calculate the M check sequences by the OBU, and a second device may calculate the M check sequences. After calculating the M check sequences, the second device sends the M check sequences to the OBU, and the OBU receives the M check sequences. The second device is, for example, the RSU, or may be a device other than the OBU and the RSU. An example in which the second device is the RSU is used herein. The following uses the first on-board function as an example. For example, the OBU may send the identifier of the first on-board function to the RSU. The RSU calculates the first check sequence, and then sends the first check sequence to the OBU. The OBU receives the first check sequence from the RSU. After determining that the first on-board function is the on-board function that is allowed to be used on the first road, the OBU may send the identifier of the first on-board function to the RSU. For example, the OBU determines, based on the information about the first road and the mapping relationship, the first on-board function that is allowed to be used by the first vehicle on the first road, sends the identifier of the first on-board function to the RSU, and receives the first check sequence from the RSU. Alternatively, the OBU may not need to determine whether the first on-board function is the on-board function that is allowed to be used on the first road. For example, if the OBU determines that the first on-board function is the on-board function that can be supported by the OBU, the OBU may send the identifier of the first on-board function to the RSU, and receive the first check sequence from the RSU. It may be understood that the M on-board functions are the on-board functions that are allowed to be used on the at least one road, or the M on-board functions may be all on-board functions supported by the first vehicle, or some on-board functions supported by the first vehicle.

The OBU may send identifiers of the M on-board functions to one RSU, and the RSU performs unified calculation. Alternatively, the OBU may send identifiers of the M on-board functions to the plurality of RSUs, and the plurality of RSUs separately perform processing. For example, the M on-board functions are the on-board functions that are determined based on the configuration information and the mapping relationship and that are allowed to be used on the at least one road. For example, for the on-board function 1, the OBU may send an identifier of the on-board function 1 to a corresponding RSU, and the corresponding RSU is an RSU that sends configuration information including information about a road on which the on-board function 1 is allowed to be used.

For example, after receiving the identifier of the first on-board function from the OBU, the RSU may determine, based on the mapping relationship described above, whether the first on-board function corresponding to the identifier of the first on-board function is allowed to be used on a road on which the first vehicle is currently located. If the first on-board function corresponding to the identifier of the first on-board function is allowed to be used on the road on which the first vehicle is currently located, the RSU may calculate the first check sequence corresponding to the first on-board function, and send the first check sequence to the OBU. Alternatively, if the first on-board function corresponding to the identifier of the first on-board function is not allowed to be used on the road on which the first vehicle is currently located, the RSU may not need to calculate the check sequence corresponding to the first on-board function. The road on which the first vehicle is located may be a road on which the first vehicle is driving. For example, that the first vehicle is located on the road may also be understood as that information about an in-vehicle global positioning system (GPS) of the first vehicle is located within a range of the road. For example, after receiving the identifiers of the M on-board functions, the RSU may send first information to the OBU. The first information may indicate whether the vehicle is allowed to use the M on-board functions on the first road. For example, the first information may carry a corresponding check sequence, and/or indication information. Specifically, the first information may carry the check sequence, the indication information, or the check sequence and the indication information.

For example, in one case, if the RSU obtains a check sequence corresponding to an identifier of one on-board function, the first information may include the check sequence. If the RSU does not obtain a check sequence corresponding to an identifier of one on-board function, the first information includes indication information corresponding to the identifier of the on-board function. In this case, if the first information includes the check sequence, the vehicle is allowed to use an on-board function corresponding to the check sequence on the first road. If the first information includes the piece of indication information, the vehicle is not allowed to use, on the first road, the on-board function indicated in the indication information, a reason why the vehicle is not allowed to use, on the first road, the on-board function indicated in the indication information (for example, the indication information includes a reason value) is indicated, or a request failure (in other words, the OBU fails to request the check sequence) is indicated. For example, the RSU obtains a total of the M check sequences. It is equivalent to that all check sequences requested by the OBU are successfully obtained. Then, the first information carries only the check sequence. Alternatively, the RSU obtains a total of 0 check sequences. It is equivalent to that none of the check sequences requested by the OBU is successfully obtained. The first information carries only the indication information. Alternatively, the RSU obtains a total of N check sequences, where N is a positive integer, and N is less than M. It is equivalent to that some check sequences requested by the OBU are successfully obtained, but some remaining check sequences requested by the OBU are not successfully obtained. The first information carries the N check sequences and the indication information. The indication information may indicate a reason why the one or more on-board functions cannot be used, or a failure of a request for check sequences corresponding to the one or more on-board functions. For example, the indication information may one-to-one correspond to the on-board function, or a plurality of on-board functions may correspond to one piece of indication information.

Alternatively, in another case, if the RSU obtains the check sequence corresponding to the identifier of the on-board function, the first information may include the check sequence. If the RSU does not obtain the check sequence corresponding to the identifier of the on-board function, the first information does not include content corresponding to the identifier of the on-board function (the check sequence corresponding to the identifier of the on-board function, and the indication information in the foregoing case). In this case, if the first information includes the check sequence, the vehicle is allowed to use the on-board function corresponding to the check sequence on the first road. If the first information does not include the check sequence corresponding to the identifier of the on-board function, the vehicle is not allowed to use the on-board function on the first road, a reason why the vehicle is not allowed to use the on-board function on the first road (for example, the indication information includes a reason value) is indicated, or a request failure (in other words, the OBU fails to request the check sequence) is indicated.

In an optional manner, in addition to sending the M check sequences to the RSU, the OBU may further send an identifier of the first vehicle to the RSU. After receiving the identifier of the first vehicle, the RSU may check the first vehicle to determine whether the first vehicle is legal. If the first vehicle is legal, the RSU further determines whether the on-board function corresponding to the identifier of the on-board function from the OBU is allowed to be used on the road on which the first vehicle is located. If the first vehicle is illegal, the RSU may not need to calculate any check sequence for the OBU.

In yet another optional manner in which the OBU obtains the M check sequences, the OBU does not need to calculate the M check sequences by the OBU, and a second device may calculate the M check sequences. After calculating the M check sequences, the second device sends the M check sequences to the OBU, and the OBU receives the M check sequences. For example, the second device may send the first information to the OBU. The first information may indicate whether the vehicle is allowed to use the M on-board functions on the first road. The second device is, for example, the RSU, or a device other than the OBU and the RSU. An example in which the second device is the RSU is used herein. Different from the previous optional manner in which the OBU obtains the M check sequences, in this optional manner, the OBU does not need to send the identifier of the first on-board function to the RSU, the RSU may actively calculate the first check sequence, and then send the first check sequence to the OBU. The OBU receives the first check sequence from the RSU. The RSU may calculate the first check sequence after determining that the first on-board function is the on-board function that is allowed to be used on the first road. For example, the RSU may determine, based on the mapping relationship, whether the first on-board function is allowed to be used on the road on which the first vehicle is currently located. If the first on-board function is allowed to be used on the road on which the first vehicle is currently located, the RSU may calculate the first check sequence corresponding to the first on-board function, and send the first information to the OBU. The first information includes the first check sequence. In this case, the first information may indicate that the vehicle is allowed to use, on the first road, the first on-board function corresponding to the first check sequence. Alternatively, if the first on-board function is not allowed to be used on the road on which the first vehicle is currently located, the RSU may not need to calculate the check sequence corresponding to the first on-board function, and send the first information to the RSU. In this case, the first information may include the indication information. The indication information is used to indicate that the vehicle is not allowed to use, on the first road, the on-board function indicated in the indication information, or a reason why the vehicle is not allowed to use, on the first road, the on-board function indicated in the indication information (for example, the indication information includes a reason value). Alternatively, the first information may also be an empty set, to indicate that the vehicle is not allowed to use, on the first road, the on-board function indicated in the indication information.

A manner of calculating the first check sequence by the RSU may be similar to a manner of calculating the first check sequence by the OBU. For example, the RSU may calculate the first check sequence based on the identifier of the first on-board function, the RSU may calculate the first check sequence based on the identifier of the first on-board function and the random sequence, the RSU may calculate the first check sequence based on the identifier of the first on-board function and the identifier of the RSU, or the RSU may calculate the first check sequence based on the identifier of the first on-board function, the random sequence, and the identifier of the RSU. For example, the RSU may input the input information (for example, the identifier of the first on-board function, the identifier of the first on-board function and the identifier of the RSU, the identifier of the first on-board function and the random sequence, or the identifier of the first on-board function, the random sequence, and the identifier of the RSU) into the first algorithm, and the output result is the first check sequence.

Steps S21 to S23 are optional steps and are not mandatory.

S24: The OBU determines to trigger the first on-board function for the first vehicle, where the first vehicle carries the OBU.

For example, when the OBU determines the on-board function that is allowed to be used by the first vehicle on the at least one road, and if the OBU determines that the first vehicle is on the first road, the OBU may trigger the first on-board function. The first on-board function may be an on-board function that is allowed to be used on the first road. In this way, the OBU may directly determine, without a decision made by a user, whether to trigger a corresponding on-board function, to reduce a workload of the user.

Alternatively, a user may determine a specific to-be-enabled on-board function. For example, if the user determines to enable the first on-board function, a corresponding operation (for example, pressing a corresponding button) may be performed to trigger the first on-board function. The user's operation may trigger the OBU, and then the OBU may trigger the first on-board function.

However, the OBU determines the on-board function that is allowed to be used by the first vehicle on the first road, and the user may not know. Therefore, an on-board function selected by the user may be an on-board function that is not allowed to be used on the first road. The case may rely on a subsequent check process of the OBU. Alternatively, there is another manner. After determining the on-board function that is allowed to be used by the first vehicle on the first road, the OBU may output second information. The second information may indicate the on-board function that is allowed to be used by the first vehicle on the first road. For example, the OBU may output the second information by using an in-vehicle audio device, or an in-vehicle video device. The second information may be output to a device such as a mobile phone of the user. In this way, the user may learn of the on-board function that is allowed to be used by the first vehicle on the first road, so that when the first vehicle is on the first road, the user may select and trigger one or some on-board functions from on-board functions that are allowed to be used on the first road.

As described above, the OBU may first obtain the M check sequences. Alternatively, in another optional manner, the OBU may not need to first obtain the M check sequences. In other words, in this case, the step S23 may not need to be performed, or may be performed after the step S24. For example, after the OBU determines the on-board function that is allowed to be used on the first road, the OBU may trigger the first on-board function. The first on-board function may be the on-board function that is allowed to be used on the first road. After the first on-board function is triggered, the OBU may calculate the first check sequence corresponding to the first on-board function. For a calculation manner, refer to the foregoing description. Alternatively, the OBU may send the identifier of the first on-board function to the RSU, the RSU calculates the first check sequence of the first on-board function, and then sends the first check sequence to the OBU. For a manner of calculating the first check sequence by the RSU, refer to the foregoing description. Certainly, if the RSU determines that the first on-board function is the on-board function that is not allowed to be used on the first road, the RSU does not calculate the check sequence of the first on-board function, and does not send the first check sequence to the OBU. In this case, the OBU cannot obtain the first check sequence.

In this way, the OBU only needs to obtain a check sequence corresponding to the triggered on-vehicle function, and does not need to obtain an excessive quantity of check sequences, to help save storage space of the OBU.

S25: The OBU checks whether the first vehicle is allowed to use the first on-board function on the first road.

For example, if the first on-board function corresponds to a check sequence (the first check sequence), the OBU may check the first check sequence. For example, the OBU may input the first check sequence into the first algorithm. If a check result indicates that the check on the first check sequence succeeds, the first vehicle is allowed to use the first on-board function on the first road, and the OBU determines that the first on-board function is the on-board function that is allowed to be used on the first road; or if a check result indicates that the check on the first check sequence fails, the first vehicle is not allowed to use the on-board function on the first road, and the OBU determines that the first on-board function is the on-board function that is not allowed to be used on the first road.

Alternatively, if the OBU obtains only a check sequence of the on-board function that is allowed to be used on the first road, but the first on-board function is the on-board function that is not allowed to be used on the first road, the OBU may not obtain the first check sequence. Alternatively, if the OBU sends the identifier of the first on-board function to the RSU, the RSU needs to check, based on the mapping relationship, the first on-board function corresponding to the identifier of the first on-board function, to determine whether the first on-board function is the on-board function that is allowed to be used by the vehicle on the first road. For example, if the RSU determines that the first on-board function is the on-board function that is not allowed to be used by the vehicle on the first road, the RSU does not calculate the first check sequence, and does not send the first check sequence to the OBU. In the two cases, the OBU does not obtain the check sequence corresponding to the first on-board function. Therefore, the check process of the OBU may be generally described as follows: The OBU first determines whether the first on-board function has a corresponding check sequence. If the first on-board function does not have the corresponding check sequence, the OBU directly determines that the check fails (or is described as that the check fails). If the first on-board function has the corresponding check sequence, the OBU may further check the check sequence. For a check process, refer to the foregoing description.

S26: When the first vehicle is on the first road, the OBU enables or disables the first on-board function based on the check result.

If the check result indicates that the check on the first check sequence succeeds, the OBU may enable the first on-board function. The first on-board function can be used only on the first road. If the first vehicle then moves on another road, and the first on-board function is allowed to be used on the road, the OBU may not perform processing. If the first on-board function is not allowed to be used on the road, the OBU may stop using the first on-board function.

Alternatively, if the check result indicates that the check on the first check sequence fails, the OBU may disable the first on-board function.

According to the technical solution provided in the embodiment of this disclosure, the vehicle is prevented from enabling, as far as possible on a corresponding road, the on-board function that is not allowed to be used on the road, to improve security and reliability of a self-driving process.

Figure 3:
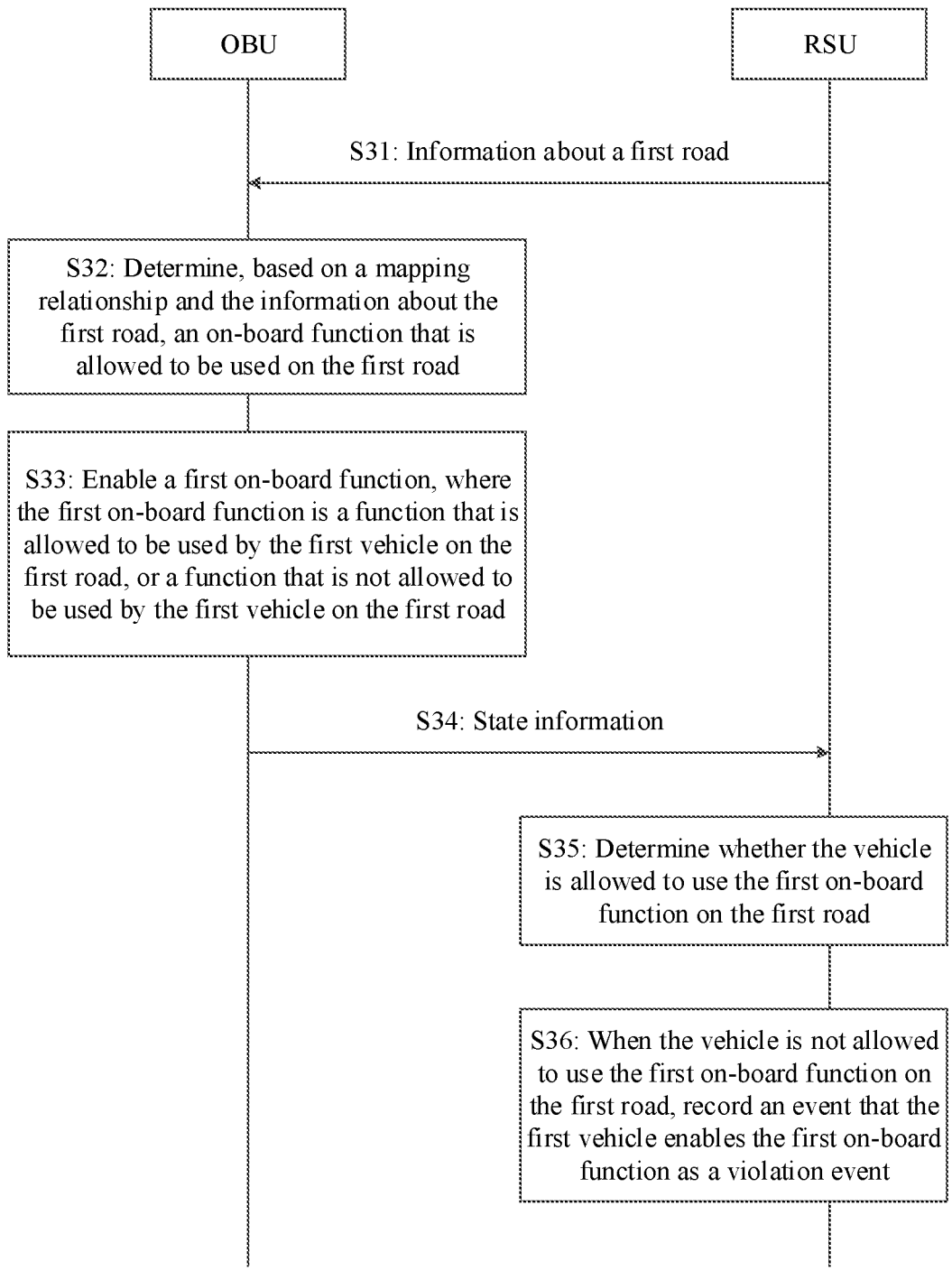
FIG. 3 is a flowchart of a second communication method according to an embodiment of this disclosure.

To resolve a same technical problem, an embodiment of this disclosure provides a second communication method. FIG. 3 is a flowchart of the method. In the following description process, an example in which the method is applied to the network architecture shown in FIG. 1 is used. In addition, the method may be performed by two communications apparatuses. For example, the two communications apparatuses are a third communications apparatus and a fourth communications apparatus. The third communications apparatus or the fourth communications apparatus may be an in-vehicle apparatus or a communications apparatus (for example, a chip system) that can support an in-vehicle apparatus in implementing a function required in the method, a roadside apparatus or a communications apparatus (for example, a chip system) that can support a roadside apparatus in implementing a function required in the method, or another communications apparatus. In addition, implementations of the third communications apparatus and the fourth communications apparatus are not limited. For example, the two communications apparatuses may be implemented in a same form. For example, the two communications apparatuses are implemented in a form of a device. Alternatively, the two communications apparatuses may be implemented in different forms. For example, the third communications apparatus is implemented in a form of a device, and the fourth communications apparatus is implemented in a manner of a chip system, or the like.

For ease of description, the following uses an example in which the method is performed by an in-vehicle apparatus and a roadside apparatus, namely, an example in which the third communications apparatus is the in-vehicle apparatus and the fourth communications apparatus is the roadside apparatus. The example in which this embodiment is applied to the network architecture shown in FIG. 1 is used. Therefore, the in-vehicle apparatus described below may be the in-vehicle device in the network architecture shown in FIG. 1, and the roadside apparatus described below may be the roadside apparatus 1 in the network architecture shown in FIG. 1. For ease of understanding, in the following description process, an example in which the in-vehicle apparatus is an OBU and the roadside apparatus is an RSU is used.

S31: The RSU sends configuration information to the OBU, and the OBU receives the configuration information from the RSU, where the configuration information is used to indicate information about at least one road. For example, the information about the at least one road includes information about a first road. Therefore, in FIG. 3, only an example in which the RSU sends the information about the first road to the OBU is used.

For the step S31, refer to the step S21 in the embodiment shown in FIG. 2.

S32: The OBU determines, based on a mapping relationship between information about a road and a vehicle function, and the information about the first road, a function that is allowed to be used by a first vehicle on the first road.

The OBU may determine, based on the configuration information and the mapping relationship between the information about the road and the vehicle function, the vehicle function that is allowed to be used by the first vehicle on the at least one road. Herein, only the first road is used as an example.

For the step S32, refer to the step S22 in the embodiment shown in FIG. 2.

S33: The OBU enables a first on-board function, where the first on-board function is the function that is allowed to be used by the first vehicle on the first road, or a function that is not allowed to be used by the first vehicle on the first road.

For example, when the OBU determines the on-board function that is allowed to be used by the first vehicle on the at least one road, and if the OBU determines that the first vehicle is on the first road, the OBU may enable the first on-board function. The first on-board function may be an on-board function that is allowed to be used on the first road. In this way, the OBU may directly determine, without a decision made by a user, whether to enable a corresponding on-board function, to reduce a workload of the user. Certainly, it is also possible that even if the OBU decides to enable the first on-board function, the first on-board function may be the on-board function that is not allowed to be used on the first road. For example, an error occurs when the OBU determines the on-board function that is allowed to be used by the first vehicle on the at least one road, the OBU mistakenly determines that the first on-board function is the on-board function that is allowed to be used on the first road. The mapping relationship is not updated in time, and as a result, the OBU mistakenly determines that the first on-board function is the on-board function that is allowed to be used on the first road. An error occurs when the OBU determines a to-be-enabled on-board function, the OBU mistakenly determines that the first on-board function is the on-board function that is allowed to be used on the first road. Alternatively, the OBU has no error, but the OBU randomly selects to enable the first on-board function, and does not determine whether the first on-board function is the on-board function that is allowed to be used on the first road, and so on.

Alternatively, a user may determine a specific to-be-enabled on-board function. For example, if the user determines to enable the first on-board function, a corresponding operation (for example, pressing a corresponding button) may be performed to enable the first on-board function. The user's operation may trigger the OBU, and the OBU may enable the first on-board function.

However, the OBU determines the on-board function that is allowed to be used by the first vehicle on the first road, and the user may not know. Therefore, an on-board function selected by the user may be the on-board function that is not allowed to be used on the first road. Therefore, a first on-board function selected by the user may be the on-board function that is not allowed to be used on the first road. For this case, there may be an improved manner. For example, after determining the on-board function that is allowed to be used by the first vehicle on the first road, the OBU may output second information. The second information may indicate the on-board function that is allowed to be used by the first vehicle on the first road. For example, the OBU may output the second information by using an in-vehicle audio device, or an in-vehicle video device. The second information may be output to a device such as a mobile phone of the user. In this way, the user may learn of the on-board function that is allowed to be used by the first vehicle on the first road, so that when the first vehicle is on the first road, the user may select to enable one or some on-board functions from the on-board functions that are allowed to be used on the first road. In this case, the first on-board function may be the on-board function that is allowed to be used on the first road. However, even if the user is notified, when selecting the on-board function, the user may not make a selection based on notified content. Because the user's memory is incorrect, an error occurs in a notification process, or the like, the first on-board function selected by the user is the on-board function that is not allowed to be used on the first road.

In conclusion, the first on-board function may be the on-board function that is allowed to be used on the first road, or the on-board function that is not allowed to be used on the first road.

S34: The OBU sends state information, and the RSU receives the state information from the OBU, where the state information is used to indicate that the first vehicle enables the first on-board function.

For example, the OBU may broadcast the state information, and the RSU may receive the state information broadcast by the OBU. The OBU may send the state information in a multicast manner, and the RSU may receive the state information send by the OBU in the multicast manner. The OBU may send the state information to the RSU in a unicast manner.

S35: The RSU determines whether the vehicle is allowed to use the first on-board function on the first road.

After receiving the state information from the OBU, the RSU may determine, based on the mapping relationship, whether the first on-board function is allowed to be used on a road on which the first vehicle is currently located. For example, the road on which the first vehicle is currently located is the first road. For example, the RSU may determine, based on the mapping relationship, whether the first on-board function corresponds to the first road. In the mapping relationship, if the first on-board function corresponds to the first road, the RSU determines that the vehicle is allowed to use the first on-board function on the first road. However, in the mapping relationship, if functions corresponding to the first road do not include the first on-board function, the RSU determines that the vehicle is not allowed to use the first on-board function on the first road.

S36: When the vehicle is not allowed to use the first on-board function on the first road, the RSU records an event that the first vehicle enables the first on-board function as a violation event.

If the RSU determines that the vehicle is not allowed to use the first on-board function on the first road, it is equivalent to that the first vehicle illegally enables the first on-board function. The RSU may record the event that the first vehicle enables the first on-board function as the violation event. For example, the RSU may communicate with a traffic management system of a public security bureau, and may send recorded information about the violation event to the traffic management system, so that the traffic management system may correspondingly punish a driver of the first vehicle. Alternatively, the RSU may send recorded information about the violation event to the first vehicle (or the OBU), so that the first vehicle can stop using the first on-board function as soon as possible, to reduce a danger. The foregoing is merely an example. A further processing manner after the RSU records the violation event is not limited in this embodiment of this disclosure.

However, if the RSU determines that the vehicle is allowed to use the first on-board function on the first road, the RSU may not perform any operation. Alternatively, the RSU may send feedback information to the first vehicle (or the OBU). The feedback information may indicate that an event that the first vehicle enables the first on-board function is a valid event.

In addition, for some technical details and the like that are not described in detail in this embodiment, refer to related descriptions of the embodiment shown in FIG. 2. For example, this embodiment does not have a check process. Therefore, content that is in the embodiment shown in FIG. 2 and that is irrelevant to the check process may be used as content of this embodiment.

According to the technical solution provided in this embodiment of this disclosure, if the OBU enables an illegal on-board function, the OBU is recorded as illegal by the RSU. The type of real-time monitoring can ensure as much as possible that a self-driving function can be enabled only on a legal road, to improve security and reliability of self-driving.

The following describes, with reference to the accompanying drawings, apparatuses configured to implement the foregoing methods in the embodiments of this disclosure. Therefore, all the foregoing descriptions may be used in subsequent embodiments. Repeated content is not described again.

Figure 4:
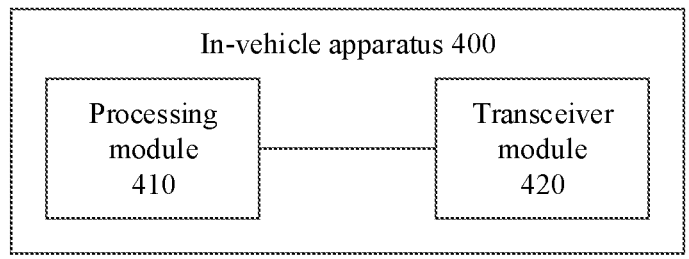
FIG. 4 is a schematic block diagram of a first in-vehicle apparatus according to an embodiment of this disclosure.

FIG. 4 is a schematic block diagram of a communications device 400 according to an embodiment of this disclosure. For example, the communications device 400 is an in-vehicle apparatus 400. The in-vehicle apparatus 400 includes a processing module 410 and a transceiver module 420. The processing module 410 may be configured to perform all operations, except sending and receiving operations, performed by the in-vehicle apparatus in the embodiment shown in FIG. 2, for example, steps S22 to S26 in the embodiment shown in FIG. 2, and/or support another process of the technology described in this specification. The transceiver module 420 may be configured to perform all sending and receiving operations performed by the roadside apparatus in the embodiment shown in FIG. 2, for example, the step S21 in the embodiment shown in FIG. 2, and/or support another process of the technology described in this specification.

The processing module 410 is configured to trigger an on-board function for a first vehicle. The first vehicle carries the in-vehicle apparatus 400.

The processing module 410 is further configured to check whether the first vehicle is allowed to use the on-board function on a first road.

The processing module 410 is further configured to enable or disable the on-board function based on a check result when the first vehicle is on the first road.

In an optional implementation, the processing module 410 is further configured to determine, based on information about the first road, the triggered on-board function.

In an optional implementation,
the processing module 410 is further configured to learn of a mapping relationship. The mapping relationship includes a mapping relationship between information about a road and a vehicle function.

The processing module 410 is configured to determine, based on the information about the first road, in the following manner, the triggered on-board function: determining the on-board function based on the information about the first road and the mapping relationship.

In an optional implementation, the processing module 410 is configured to learn of (obtain) the mapping relationship in the following manner:
receiving the mapping relationship from a roadside apparatus by using the transceiver module 420;
obtaining the mapping relationship from the in-vehicle apparatus, the mapping relationship being pre-configured with at least one relationship between road information and vehicle function; or
receive from a server a map that includes the mapping relationship.

In an optional implementation, the transceiver module 420 is further configured to receive the information about the first road from the roadside apparatus; or the processing module 410 is further configured to obtain a map from a server, and the information about the first road included in the map.

In an optional implementation, the processing module 410 is configured to check, in the following manner, whether the first vehicle is allowed to use the on-board function on the first road:

checking a first check sequence to obtain the check result.

When the check result indicates that the check on the first check sequence succeeds, the first vehicle is allowed to use the on-board function on the first road.

When the check result indicates that the check on the first check sequence fails, the first vehicle is not allowed to use the on-board function on the first road, and the first check sequence is a check sequence corresponding to the on-board function.

In an optional implementation, the processing module 410 is further configured to:

determine, based on the information about the first road, the on-board function that is allowed to be used by the first vehicle on the first road, and obtain the first check sequence corresponding to the on-board function; or determine the on-board function supported by the first vehicle, and obtain the first check sequence corresponding to the on-board function.

In an optional implementation, the processing module 410 is configured to obtain, in the following manner, the first check sequence corresponding to the on-board function:

calculating the first check sequence based on an identifier of the on-board function;

receiving, by using the transceiver module 420, the first check sequence that is from the roadside apparatus and that corresponds to the on-board function; or sending, by using the transceiver module 420, an identifier of the on-board function to the roadside apparatus, and receiving the first check sequence from the roadside apparatus.

In an optional implementation, the processing module 410 is configured to calculate the first check sequence based on the identifier of the on-board function in the following manner:

calculating the first check sequence based on the identifier of the on-board function;

calculating the first check sequence based on the identifier of the on-board function and a random sequence;

calculating the first check sequence based on the identifier of the on-board function and an identifier of the roadside apparatus; or calculating the first check sequence based on the identifier of the on-board function, a random sequence, and an identifier of the roadside apparatus.

In an optional implementation, the information about the first road includes one or any combination of the following:

a type of the first road, a geographical range of the first road, track information of the first road, an identifier of the first road, an identity of a lane on the first road, or an effective time period corresponding to the first road, where the type of the first road is effective within the effective time period.

It should be understood that the processing module 410 in this embodiment of this disclosure may be implemented by a processor or a processor-related circuit component, and the transceiver module 420 may be implemented by a transceiver or a transceiver-related circuit component.

Figure 5:
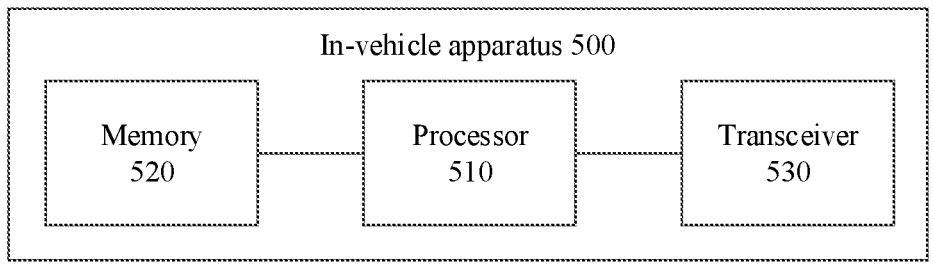
FIG. 5 is another schematic block diagram of a first in-vehicle apparatus according to an embodiment of this disclosure.

As shown in FIG. 5, an embodiment of this disclosure further provides a communications device 500. For example, the communications device 500 is an in-vehicle apparatus 500. The in-vehicle apparatus 500 includes a processor 510, a memory 520, and a transceiver 530. The memory 520 stores an instruction or a program. The processor 510 is configured to execute the instruction or the program stored in the memory 520. When the instruction or program stored in the memory 520 is executed, the processor 510 is configured to perform an operation performed by the processing module 410 in the foregoing embodiment, and the transceiver 530 is configured to perform an operation performed by the transceiver module 420 in the foregoing embodiment.

It should be understood that the in-vehicle apparatus 400 or the in-vehicle apparatus 500 according to the embodiments of this disclosure may correspond to the in-vehicle apparatus in the embodiment shown in FIG. 2. Operations and/or functions of modules in the in-vehicle apparatus 400 or the in-vehicle apparatus 500 are respectively intended to implement corresponding procedures in the embodiment shown in FIG. 2. For brevity, details are not described herein.

Figure 6:
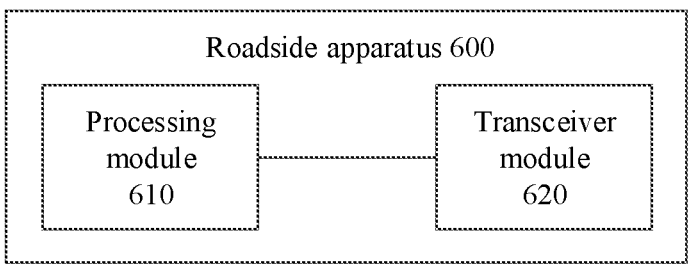
FIG. 6 is a schematic block diagram of a first roadside apparatus according to an embodiment of this disclosure.

FIG. 6 is a schematic block diagram of a communications device 600 according to an embodiment of this disclosure. For example, the communications device 600 is a roadside apparatus 600. The roadside apparatus 600 includes a processing module 610 and a transceiver module 620. The processing module 610 may be configured to perform all operations, except sending and receiving operations, performed by the roadside apparatus in the embodiment shown in FIG. 2, for example, the operation of determining whether the vehicle is allowed to use the on-board function on the first road in the embodiment shown in FIG. 2, and/or support another process of the technology described in this specification. The transceiver module 620 may be configured to perform all sending and receiving operations performed by the roadside apparatus in the embodiment shown in FIG. 2, for example, the operation of sending the first information to the in-vehicle apparatus in the step S21 in the embodiment shown in FIG. 2, and/or support another process of the technology described in this specification.

The transceiver module 620 is configured to receive an identifier of an on-board function from an in-vehicle apparatus.

The processing module 610 is configured to determine whether a vehicle is allowed to use the on-board function on a first road.

The transceiver module 620 is further configured to send first information to the in-vehicle apparatus.

In an optional implementation, the first information is used to indicate whether the vehicle is allowed to use the on-board function on the first road.

In an optional implementation, the determining result is that the vehicle is allowed to use the on-board function on the first road. The transceiver module 620 is configured to send the first information to the in-vehicle apparatus in the following manner:

The transceiver module 620 sends a first check sequence corresponding to the on-board function to the in-vehicle apparatus.

In an optional implementation, the processing module 610 is configured to obtain, in the following manner, the first check sequence corresponding to the on-board function:

calculating the first check sequence based on the identifier of the on-board function;

calculating the first check sequence based on the identifier of the on-board function and a random sequence;

calculating the first check sequence based on the identifier of the on-board function and an identifier of the roadside apparatus; or calculating the first check sequence based on the identifier of the on-board function, a random sequence, and an identifier of the roadside apparatus.

In an optional implementation, the determining result is that the vehicle is not allowed to use the on-board function on the first road. The transceiver module 620 is configured to send the first information to the in-vehicle apparatus in the following manner:

sending indication information to the in-vehicle apparatus, where the indication information is used to indicate a request failure, or a reason why the vehicle is not allowed to use the on-board function on the first road.

In an optional implementation, the transceiver module 620 is further configured to send information about the first road to the in-vehicle apparatus. The information about the first road is used to determine the on-board function that is allowed to be used by the vehicle on the first road.

In an optional implementation, the information about the first road includes one or any combination of the following:

a type of the first road, a geographical range of the first road, track information of the first road, an identifier of the first road, an identity of a lane on the first road, or an effective time period corresponding to the first road, where the type of the first road is effective within the effective time period.

It should be understood that the processing module 610 in this embodiment of this disclosure may be implemented by a processor or a processor-related circuit component, and the transceiver module 620 may be implemented by a transceiver or a transceiver-related circuit component.

Figure 7:
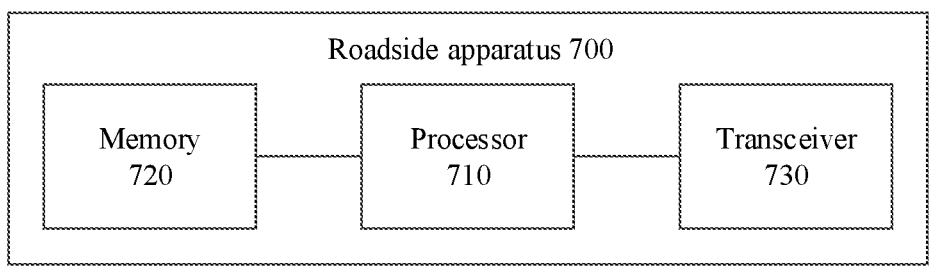
FIG. 7 is another schematic block diagram of a first roadside apparatus according to an embodiment of this disclosure.

As shown in FIG. 7, an embodiment of this disclosure further provides a communications device 700. For example, the communications device 700 is a roadside apparatus 700. The roadside apparatus 700 includes a processor 710, a memory 720, and a transceiver 730. The memory 720 stores an instruction or a program. The processor 710 is configured to execute the instruction or the program stored in the memory 720. When the instruction or program stored in the memory 720 is executed, the processor 710 is configured to perform an operation performed by the processing module 610 in the foregoing embodiment, and the transceiver 730 is configured to perform an operation performed by the transceiver module 620 in the foregoing embodiment.

It should be understood that the roadside apparatus 600 or the roadside apparatus 700 according to the embodiments of this disclosure may correspond to the roadside apparatus in the embodiment shown in FIG. 2. Operations and/or functions of modules in the roadside apparatus 600 or the roadside apparatus 700 are respectively intended to implement corresponding procedures in the embodiment shown in FIG. 2. For brevity, details are not described herein.

Figure 8:
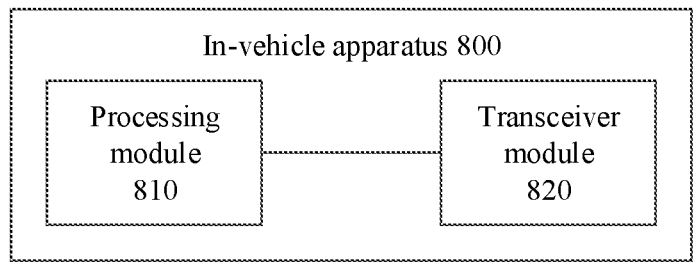
FIG. 8 is a schematic block diagram of a second in-vehicle apparatus according to an embodiment of this disclosure.

FIG. 8 is a schematic block diagram of a communications device 800 according to an embodiment of this disclosure. For example, the communications device 800 is an in-vehicle apparatus 800. The in-vehicle apparatus 800 includes a processing module 810 and a transceiver module 820. The processing module 810 may be configured to perform all operations, except sending and receiving operations, performed by the in-vehicle apparatus in the embodiment shown in FIG. 3, for example, steps S32 and S33 in the embodiment shown in FIG. 3, and/or support another process of the technology described in this specification. The transceiver module 820 may be configured to perform all sending and receiving operations performed by the in-vehicle apparatus in the embodiment shown in FIG. 3, for example, the step S31 and the step S34 in the embodiment shown in FIG. 3, and/or support another process of the technology described in this specification.

The transceiver module 820 is configured to receive information about a first road.

The processing module 810 is configured to determine, based on a mapping relationship between information about a road and a vehicle function and the information about the first road, a function that is allowed to be used by a first vehicle on the first road. The first vehicle carries the in-vehicle apparatus 800.

In an optional implementation, the processing module 810 is further configured to enable an on-board function. The on-board function is the function that is allowed to be used by the first vehicle on the first road, or a function that is not allowed to be used by the first vehicle on the first road.

The transceiver module 820 is further configured to send state information. The state information is used to indicate that the first vehicle enables the on-board function.

In an optional implementation, the information about the first road includes one or any combination of the following:

a type of the first road, a geographical range of the first road, track information of the first road, an identifier of the first road, an identity of a lane on the first road, or an effective time period corresponding to the first road, where the type of the first road is effective within the effective time period.

It should be understood that the processing module 810 in this embodiment of this disclosure may be implemented by a processor or a processor-related circuit component, and the transceiver module 820 may be implemented by a transceiver or a transceiver-related circuit component.

Figure 9:
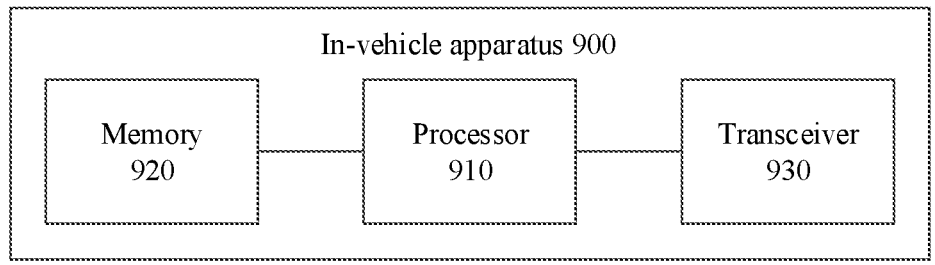
FIG. 9 is another schematic block diagram of a second in-vehicle apparatus according to an embodiment of this disclosure.

As shown in FIG. 9, an embodiment of this disclosure further provides a communications device 900. For example, the communications device 900 is an in-vehicle apparatus 900. The in-vehicle apparatus 900 includes a processor 910, a memory 920, and a transceiver 930. The memory 920 stores an instruction or a program. The processor 910 is configured to execute the instruction or the program stored in the memory 920. When the instruction or program stored in the memory 920 is executed, the processor 910 is configured to perform an operation performed by the processing module 810 in the foregoing embodiment, and the transceiver 930 is configured to perform an operation performed by the transceiver module 820 in the foregoing embodiment.

It should be understood that the in-vehicle apparatus 800 or the in-vehicle apparatus 900 according to the embodiments of this disclosure may correspond to the in-vehicle apparatus in the embodiment shown in FIG. 3. Operations and/or functions of modules in the in-vehicle apparatus 800 or the in-vehicle apparatus 900 are respectively intended to implement corresponding procedures in the embodiment shown in FIG. 3. For brevity, details are not described herein.

Figure 10:
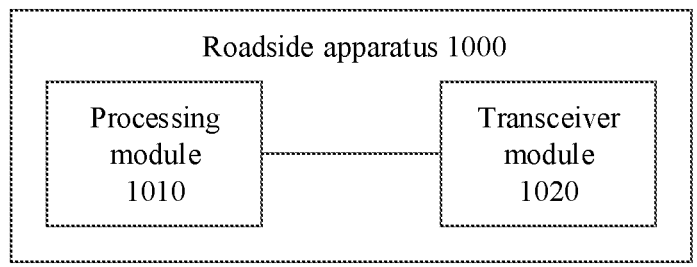
FIG. 10 is a schematic block diagram of a second roadside apparatus according to an embodiment of this disclosure.

FIG. 10 is a schematic block diagram of a communications device 1000 according to an embodiment of this disclosure. For example, the communications device 1000 is a roadside apparatus 1000. The roadside apparatus 1000 includes a processing module 1010 and a transceiver module 1020. The processing module 1010 may be configured to perform all operations, except sending and receiving operations, performed by the roadside apparatus in the embodiment shown in FIG. 3, for example, steps S35 and S36 in the embodiment shown in FIG. 3, and/or support another process of the technology described in this specification. The transceiver module 1020 may be configured to perform all sending and receiving operations performed by the roadside apparatus in the embodiment shown in FIG. 3, for example, the operation of sending the first information to the in-vehicle apparatus in the step S34 and the step S31 in the embodiment shown in FIG. 3, and/or support another process of the technology described in this specification.

The transceiver module 1020 is configured to receive state information from an in-vehicle apparatus. The state information is used to indicate that a first vehicle that carries the in-vehicle apparatus enables an on-board function.

The processing module 1010 is configured to determine whether a vehicle is allowed to use the on-board function on a first road.

The processing module 1010 is further configured to: when the vehicle is not allowed to use the on-board function on the first road, record an event that the first vehicle enables the on-board function as a violation event.

In an optional implementation, the processing module 1010 is configured to determines, in the following manner, whether the vehicle is allowed to use the on-board function on the first road:

determining, based on a mapping relationship between information about a road and a vehicle function, whether the on-board function corresponds to the first road. When the on-board function corresponds to the first road, the vehicle is allowed to use the on-board function on the first road. Otherwise, the vehicle is not allowed to use the on-board function on the first road.

It should be understood that the processing module 1010 in this embodiment of this disclosure may be implemented by a processor or a processor-related circuit component, and the transceiver module 1020 may be implemented by a transceiver or a transceiver-related circuit component.

Figure 11:
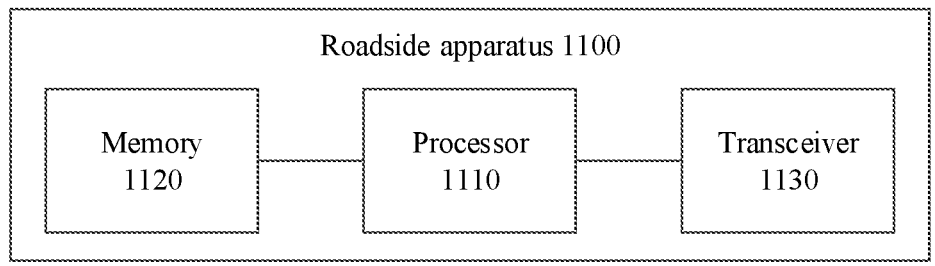
FIG. 11 is another schematic block diagram of a second roadside apparatus according to an embodiment of this disclosure.

As shown in FIG. 11, an embodiment of this disclosure further provides a communications device 1100. For example, the communications device 1100 is a roadside apparatus 1100. The roadside apparatus 1100 includes a processor 1110, a memory 1120, and a transceiver 1130. The memory 1120 stores an instruction or a program. The processor 1110 is configured to execute the instruction or the program stored in the memory 1120. When the instruction or program stored in the memory 1120 is executed, the processor 1110 is configured to perform an operation performed by the processing module 1010 in the foregoing embodiment, and the transceiver 1130 is configured to perform an operation performed by the transceiver module 1020 in the foregoing embodiment.

It should be understood that the roadside apparatus 1000 or the roadside apparatus 1100 according to the embodiments of this disclosure may correspond to the roadside apparatus in the embodiment shown in FIG. 3. Operations and/or functions of modules in the roadside apparatus 1000 or the roadside apparatus 1100 are respectively intended to implement corresponding procedures in the embodiment shown in FIG. 3. For brevity, details are not described herein.

An embodiment of this disclosure further provides a communications apparatus. The communications apparatus may be an in-vehicle apparatus, a roadside apparatus, or a circuit. The communications apparatus may be configured to perform an action performed by the in-vehicle apparatus or the roadside apparatus in the method embodiment shown in FIG. 2 or the method embodiment shown in FIG. 3.

Figure 12:
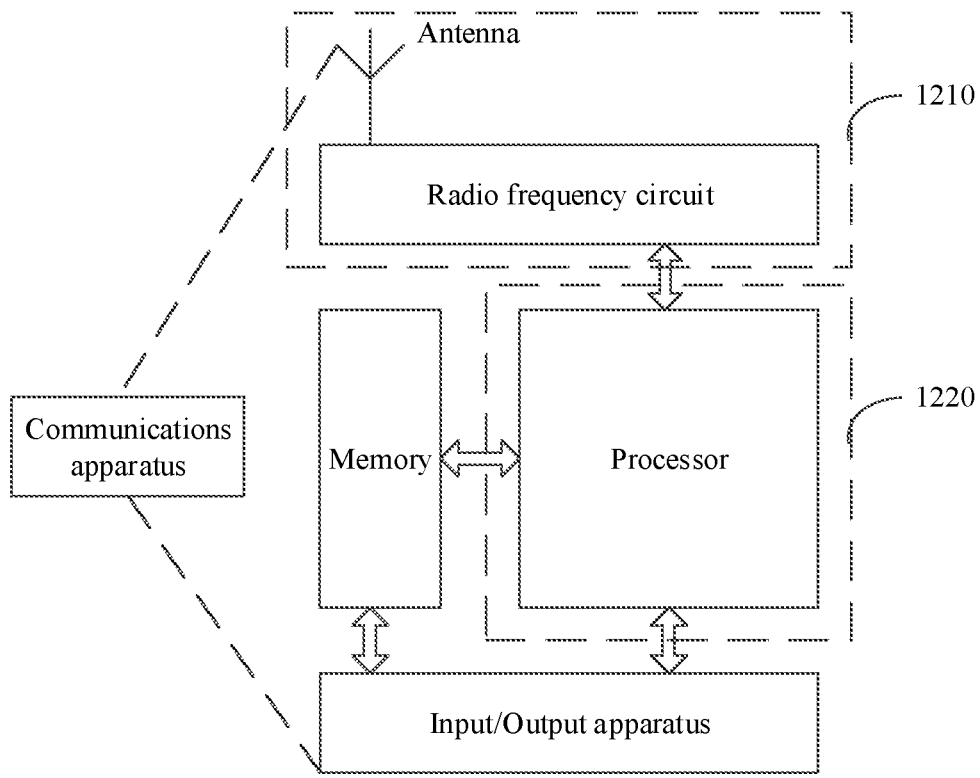
FIG. 12 is a schematic block diagram of a communications apparatus according to an embodiment of this disclosure.

When the communications apparatus is the in-vehicle apparatus or the roadside apparatus, FIG. 12 is a schematic diagram of a structure of the simplified communications apparatus. As shown in FIG. 12, the communications apparatus includes a processor, a memory, a radio frequency circuit, an antenna, and an input/output apparatus. The processor is mainly configured to: process a communications protocol and communication data, and control the communications apparatus to execute a software program, process data of the software program, and the like. The memory is mainly configured to store a software program and data. The radio frequency circuit is mainly configured to: perform conversion between a baseband signal and a radio frequency signal, and process the radio frequency signal. The antenna is mainly configured to receive and transmit a radio frequency signal in an electromagnetic wave form. The input/output apparatus, for example, a touchscreen, a display screen, or a keyboard, is mainly configured to receive data input by a user and output data to the user. It should be noted that some communications apparatuses may not have the input/output apparatus.

When data needs to be sent, the processor performs baseband processing on the to-be-sent data, and outputs a baseband signal to the radio frequency circuit. After performing radio frequency processing on the baseband signal, the radio frequency circuit sends a radio frequency signal in an electromagnetic wave form by using the antenna. When data is sent to the communications apparatus, the radio frequency circuit receives a radio frequency signal through the antenna, converts the radio frequency signal into a baseband signal, and outputs the baseband signal to the processor. The processor converts the baseband signal into data, and processes the data. For ease of description, FIG. 12 shows only one memory and one processor. In an actual communications apparatus product, there may be one or more processors and one or more memories. The memory may also be referred to as a storage medium, a storage device, or the like. The memory may be disposed independent of the processor, or may be integrated with the processor. This is not limited in this embodiment of this disclosure.

In this embodiment of this disclosure, the antenna having receiving and sending functions and the radio frequency circuit may be considered as a transceiver unit of the communications apparatus, and the processor having a processing function may be considered as a processing unit of the communications apparatus. As shown in FIG. 12, the communications apparatus includes a transceiver unit 1210 and a processing unit 1220. The transceiver unit may also be referred to as a transceiver, a transceiver machine, a transceiver apparatus, or the like. The processing unit may also be referred to as a processor, a processing board, a processing module, a processing apparatus, or the like. Optionally, a component for implementing a receiving function in the transceiver unit 1210 may be considered as a receiving unit, and a component for implementing a sending function in the transceiver unit 1210 may be considered as a sending unit. In other words, the transceiver unit 1210 includes the receiving unit and the sending unit. The transceiver unit may also be sometimes referred to as a transceiver, a transceiver machine, a transceiver circuit, or the like. The receiving unit may also be sometimes referred to as a receiver, a receiver machine, a receiver circuit, or the like. The sending unit may also be sometimes referred to as a transmitter, a transmitter machine, a transmitter circuit, or the like.

It should be understood that the transceiver unit 1210 is configured to perform a sending operation and a receiving operation of the in-vehicle apparatus in the method embodiment shown in FIG. 2, and the processing unit 1220 is configured to perform an operation other than the receiving/sending operation of the in-vehicle apparatus in the method embodiment shown in FIG. 2.

For example, in an implementation, the transceiver unit 1210 is configured to perform the sending and receiving steps of the in-vehicle apparatus in the embodiment shown in FIG. 2, for example, the step S21, and/or support another process of the technology described in this specification. The processing unit 1220 is configured to perform another operation, other than the sending and receiving operations, performed by the in-vehicle apparatus in the embodiment shown in FIG. 2, for example, steps S22 to S26 in the embodiment shown in FIG. 2, and/or support another process of the technology described in this specification.

Alternatively, the transceiver unit 1210 is configured to perform the sending operation and the receiving operation of the roadside apparatus in the method embodiment shown in FIG. 2, and the processing unit 1220 is configured to perform another operation other than the receiving/sending operation of the roadside apparatus in the method embodiment shown in FIG. 2.

For example, in an implementation, the transceiver unit 1210 is configured to perform the sending and receiving steps of the roadside apparatus in the embodiment shown in FIG. 2, for example, the step S21, and/or support another process of the technology described in this specification. The processing module 1220 is configured to perform another operation, other than the sending and receiving operations, performed by the roadside apparatus in the embodiment shown in FIG. 2, for example, the operation of determining whether the vehicle is allowed to use the on-board function on the first road in the embodiment shown in FIG. 2, and/or support another process of the technology described in this specification.

Alternatively, the transceiver unit 1210 is configured to perform the sending operation and the receiving operation of the in-vehicle apparatus side in the method embodiment shown in FIG. 3, and the processing unit 1220 is configured to perform another operation other than the receiving/sending operation of the in-vehicle apparatus side in the method embodiment shown in FIG. 3.

For example, in an implementation, the transceiver unit 1210 is configured to perform the sending and receiving steps of the in-vehicle apparatus in the embodiment shown in FIG. 3, for example, the step S31 and the step S34, and/or support another process of the technology described in this specification. The processing unit 1220 is configured to perform another operation, other than the sending and receiving operations, performed by the in-vehicle apparatus in the embodiment shown in FIG. 3, for example, steps S32 and S33, and/or support another process of the technology described in this specification.

Alternatively, the transceiver unit 1210 is configured to perform the sending operation and the receiving operation of the roadside apparatus side in the method embodiment shown in FIG. 3, and the processing unit 1220 is configured to perform another operation other than the receiving/sending operation of the roadside apparatus side in the method embodiment shown in FIG. 3.

For example, in an implementation, the transceiver unit 1210 is configured to perform the sending and receiving steps of the roadside apparatus in the embodiment shown in FIG. 3, for example, the step S31 and the step S34, and/or support another process of the technology described in this specification. The processing unit 1220 is configured to perform another operation, other than the sending and receiving operations, performed by the roadside apparatus in the embodiment shown in FIG. 3, for example, steps S35 and S36, and/or support another process of the technology described in this specification.

When the communications apparatus is a chip, the chip includes a transceiver unit and a processing unit. The transceiver unit may be an input/output circuit or a communications interface. The processing unit is a processor, a microprocessor, or an integrated circuit integrated on the chip.

Figure 13:
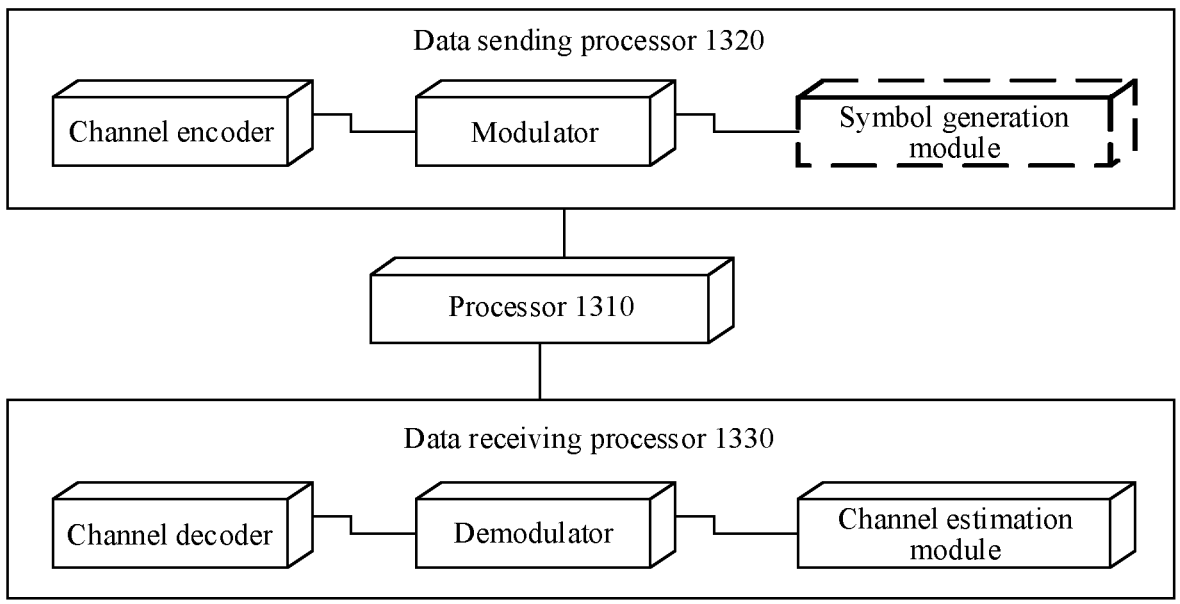
FIG. 13 is another schematic block diagram of a communications apparatus according to an embodiment of this disclosure.

For the communications apparatus in this embodiment of this disclosure, further refer to the device shown in FIG. 13. As an example, the device may implement a function similar to that of a processor 1310 in FIG. 13. In FIG. 13, the device includes the processor 1310, a data sending processor 1320, and a data receiving processor 1330. The processing module 410 in the foregoing embodiment may be the processor 1310 in FIG. 13, and completes a corresponding function. The transceiver module 420 in the foregoing embodiment may be the data sending processor 1320 and/or the data receiving processor 1330 in FIG. 13. The processing module 610 in the foregoing embodiment may be the processor 1310 in FIG. 13, and completes a corresponding function. The transceiver module 620 in the foregoing embodiment may be the data sending processor 1320 and/or the data receiving processor 1330 in FIG. 13. The processing module 810 in the foregoing embodiment may be the processor 1310 in FIG. 13, and completes a corresponding function. The transceiver module 820 in the foregoing embodiment may be the data sending processor 1320 and/or the data receiving processor 1330 in FIG. 13. The processing module 1010 in the foregoing embodiment may be the processor 1310 in FIG. 13, and completes a corresponding function. The transceiver module 1020 in the foregoing embodiment may be the data sending processor 1320 and/or the data receiving processor 1330 in FIG. 13.

Although FIG. 13 shows a channel encoder and a channel decoder, it may be understood that these modules are merely examples, and do not constitute a limitation on this embodiment.

Figure 14:
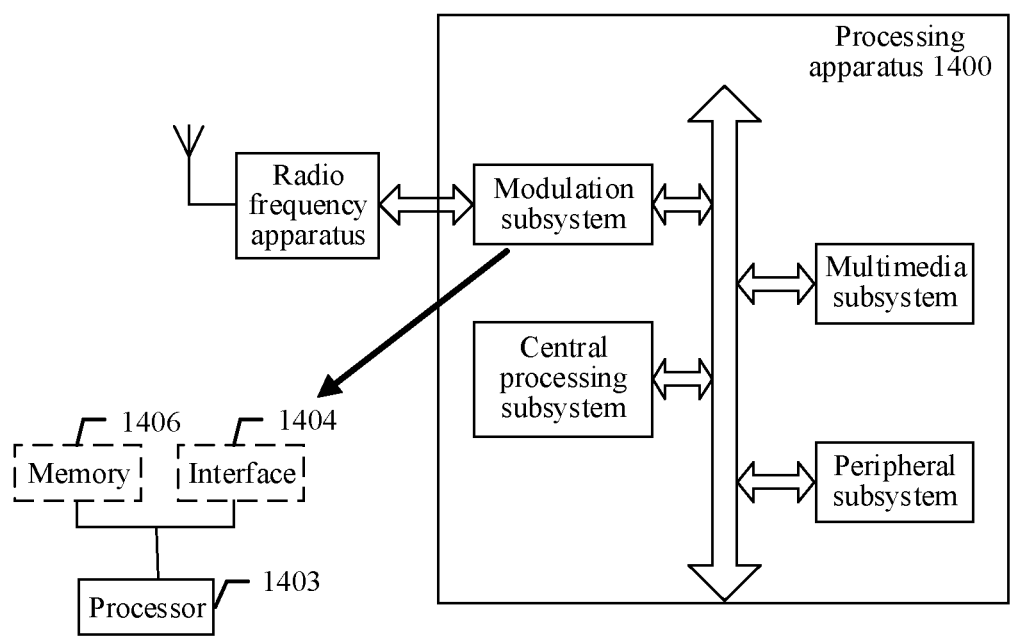
FIG. 14 is yet another schematic block diagram of a communications apparatus according to an embodiment of this disclosure.

FIG. 14 shows another form of this embodiment. A processing apparatus 1400 includes modules such as a modulation subsystem, a central processing subsystem, and a peripheral subsystem. The communications apparatus in this embodiment may be used as the modulation subsystem in the processing apparatus 1400. Specifically, the modulation subsystem may include a processor 1403 and an interface 1404. The processor 1403 implements a function of the processing module 410, and the interface 1404 implements a function of the transceiver module 420. The processor 1403 implements a function of the processing module 610, and the interface 1404 implements a function of the transceiver module 620. The processor 1403 implements a function of the processing module 810, and the interface 1404 implements a function of the transceiver module 820. The processor 1403 implements a function of the processing module 1010, and the interface 1404 implements a function of the transceiver module 1020. In another variation, the modulation subsystem includes a memory 1406, a processor 1403, and a program that is stored in the memory 1406 and that can be run on the processor. When executing the program, the processor 1403 implements the method on the in-vehicle apparatus or roadside apparatus side in the method embodiment shown in FIG. 2 or FIG. 3. It should be noted that the memory 1406 may be non-volatile or volatile. The memory 1406 may be located in the modulation subsystem, or in the processing apparatus 1400, provided that the memory 1406 can be connected to the processor 1403.

An embodiment of this disclosure further provides a first communications system. The communications system may include at least one in-vehicle apparatus in the embodiment shown in FIG. 2, and a roadside apparatus in the embodiment shown in FIG. 2. The in-vehicle apparatus is, for example, the in-vehicle apparatus 400 in FIG. 4 or the in-vehicle apparatus 500 in FIG. 5, and the roadside apparatus is, for example, the roadside apparatus 600 in FIG. 6 or the roadside apparatus 700 in FIG. 7. For example, the in-vehicle apparatus may be configured to perform all operations performed by the in-vehicle apparatus in the embodiment shown in FIG. 2, for example, the steps S21 to S26 in the embodiment shown in FIG. 2, and/or support another process of the technology described in this specification. The roadside apparatus may be configured to perform all operations performed by the roadside apparatus in the embodiment shown in FIG. 2, for example, the step S21 and the operation of determining whether the vehicle is allowed to use the on-board function on the first road in the embodiment shown in FIG. 2, and/or support another process of the technology described in this specification.

An embodiment of this disclosure further provides a second communications system. The communications system may include at least one in-vehicle apparatus in the embodiment shown in FIG. 3, and a roadside apparatus in the embodiment shown in FIG. 3. The in-vehicle apparatus is, for example, the in-vehicle apparatus 800 in FIG. 8 or the in-vehicle apparatus 900 in FIG. 9, and the roadside apparatus is, for example, the roadside apparatus 1000 in FIG. 10 or the roadside apparatus 1100 in FIG. 11. For example, the in-vehicle apparatus is configured to perform all operations performed by the in-vehicle apparatus in the embodiment shown in FIG. 3, for example, the steps S31, S32, S33, and S34 in the embodiment shown in FIG. 3, and/or support another process of the technology described in this specification. The roadside apparatus may be configured to perform all operations performed by the roadside apparatus in the embodiment shown in FIG. 3, for example, the steps S31, S34, S35, and S36 in the embodiment shown in FIG. 3, and/or support another process of the technology described in this specification.

The first communications system and the second communications system may be a same communications system, or may be different communications systems.

An embodiment of this disclosure further provides a computer-readable storage medium. The computer-readable storage medium stores a computer program. When the program is executed by a processor, a procedure related to the in-vehicle apparatus in the embodiment shown in FIG. 2 provided in the foregoing method embodiment may be implemented.

An embodiment of this disclosure further provides a computer-readable storage medium. The computer-readable storage medium stores a computer program. When the program is executed by a processor, a procedure related to the roadside apparatus in the embodiment shown in FIG. 2 provided in the foregoing method embodiment may be implemented.

An embodiment of this disclosure further provides a computer-readable storage medium. The computer-readable storage medium stores a computer program. When the program is executed by a processor, a procedure related to the in-vehicle apparatus in the embodiment shown in FIG. 3 provided in the foregoing method embodiment may be implemented.

An embodiment of this disclosure further provides a computer-readable storage medium. The computer-readable storage medium stores a computer program. When the program is executed by a processor, a procedure related to the roadside apparatus in the embodiment shown in FIG. 3 provided in the foregoing method embodiment may be implemented.

An embodiment of this disclosure further provides a computer program product including an instruction. When the instruction is executed, the method on the in-vehicle apparatus side in the method embodiment shown in FIG. 2 is performed.

An embodiment of this disclosure further provides a computer program product including an instruction. When the instruction is executed, the method on the roadside apparatus side in the method embodiment shown in FIG. 2 is performed.

An embodiment of this disclosure further provides a computer program product including an instruction. When the instruction is executed, the method on the in-vehicle apparatus side in the method embodiment shown in FIG. 3 is performed.

An embodiment of this disclosure further provides a computer program product including an instruction. When the instruction is executed, the method on the roadside apparatus side in the method embodiment shown in FIG. 3 is performed.

It should be understood that the processor mentioned in the embodiments of this disclosure may be a central processing unit (CPU). The processor may further be a general purpose processor, a digital signal processor (DSP), an application-specific integrated circuit (ASIC), a field programmable gate array (FPGA), or another programmable logic device, discrete gate or transistor logic device, discrete hardware component, or the like. The general purpose processor may be a microprocessor, or the processor may be any conventional processor, or the like.

It may be understood that the memory mentioned in the embodiments of this disclosure may be a volatile memory, or a non-volatile memory, or may include a volatile memory and a non-volatile memory. The non-volatile memory may be a ROM, a programmable read-only memory (PROM), an erasable programmable read-only memory (EPROM), an electrically erasable programmable read-only memory (EEPROM), or a flash memory. The volatile memory may be a RAM and is used as an external cache. According to a description that is used as an example instead of a limitation, RAMs in many forms may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

It should be noted that when the processor is a general-purpose processor, a DSP, an ASIC, an FPGA, or another programmable logic device, a discrete gate or a transistor logic device, or discrete hardware component, the memory (storage module) is integrated into the processor.

It should be noted that the memory described in this specification aims to include but is not limited to these memories and any memory of another proper type.

It should be understood that sequence numbers of the foregoing processes do not mean execution sequences in various embodiments of this disclosure. The execution sequences of the processes should be determined according to functions and internal logic of the processes, and should not be construed as any limitation on the implementation processes of the embodiments of this disclosure.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this disclosure.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this disclosure, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this disclosure essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this disclosure. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this disclosure, but are not intended to limit the protection scope of the embodiments of this disclosure. Any variation or replacement readily figured out by a person skilled in the art within the technical scope disclosed in the embodiments of this disclosure shall fall within the protection scope of this disclosure. Therefore, the protection scope of the embodiments of this disclosure shall be subject to the protection scope of the claims.

What is claimed is:

1. A method, comprising:
   determining, by an in-vehicle apparatus, an on-board function for a first vehicle;
   determining, by the in-vehicle apparatus, whether the first vehicle is allowed to use the on-board function on a first road based on a mapping relationship between information about the first road and the on-board function, the mapping relationship being part of a mapping table between a plurality of on-board functions and a plurality of road types; and
   when the first vehicle is on the first road, enabling, by the in-vehicle apparatus, the on-board function when the first vehicle has been determined to be allowed to use the on-board function on the first road;
   determining, by the in-vehicle apparatus, whether the first vehicle is allowed to use the on-board function on a second road; and
   when the first vehicle is on the second road, disabling, by the in-vehicle apparatus, the on-board function when the first vehicle has been determined to be not allowed to use the on-board function on the second road, the disabling including preventing manually enabling the on-board function.

2. The method according to claim 1, wherein the determining the on-board function is based on the information about the first road.

3. The method according to claim 2, further comprising:
   obtaining, by the in-vehicle apparatus, the mapping relationship between information about the first road and the on-board function, wherein the determining the on-board function based on information about the first road comprises:
   determining the on-board function based on the information about the first road and the mapping relationship.

4. The method according to claim 3, wherein the obtaining of the mapping relationship comprises one of:
   receiving the mapping relationship from a roadside apparatus; or
   obtaining the mapping relationship from the in-vehicle apparatus, the mapping relationship being pre-configured with at least one relationship between road information and the on-board function; or
   receiving, from a server, a map that includes the mapping relationship.

5. The method according to claim 2, further comprising:
   receiving the information about the first road from a roadside apparatus; or
   receiving, from a server, a map that includes the information about the first road.

6. The method according to claim 1, wherein the determining, by the in-vehicle apparatus, whether the first vehicle is allowed to use the on-board function on the first road comprises:

determining, by the in-vehicle apparatus, a first check sequence to obtain a check result, wherein:
  when the check result indicates that a check on the first check sequence succeeds, the first vehicle is allowed to use the on-board function on the first road; and
  when the check result indicates that a check on the first check sequence fails, the first vehicle is not allowed to use the on-board function on the first road, the first check sequence corresponding to the on-board function.

7. The method according to claim 6, further comprising:
  determining, by the in-vehicle apparatus, based on the information about the first road, the on-board function that is allowed to be used by the first vehicle on the first road, and obtaining the first check sequence corresponding to the on-board function; or
  determining, by the in-vehicle apparatus, the on-board function supported by the first vehicle, and obtaining the first check sequence corresponding to the on-board function.

8. The method according to claim 2, wherein the information about the first road comprises at least one of:
  a type of the first road;
  a geographical range of the first road;
  track information of the first road;
  an identifier of the first road;
  an identity of a lane on the first road; or
  an effective time period associated with the first road, wherein use of the on-board function is permitted within the effective time period.

9. An in-vehicle apparatus, comprising:
  at least one processor and a memory, the memory being configured to store program instructions that, when executed by the processor, cause the in-vehicle apparatus to perform operations including:
  determining an on-board function for a first vehicle;
  determining whether the first vehicle is allowed to use the on-board function on a first road based on a mapping relationship between information about the first road and the on-board function, the mapping relationship being part of a mapping table between a plurality of on-board functions and a plurality of road types;
  when the first vehicle is on the first road, enabling the on-board function when the first vehicle has been determined to be allowed to use the on-board function on the first road;
  determining whether the first vehicle is allowed to use the on-board function on a second road; and
  when the first vehicle is on the second road, disabling the on-board function when the first vehicle has been determined to be not allowed to use the on-board function on the second road, the disabling including preventing manually enabling the on-board function.

10. The in-vehicle apparatus according to claim 9, wherein the determining the on-board function is based on the information about the first road.

11. The in-vehicle apparatus according to claim 10 the operations further comprising:
  obtaining the mapping relationship between information about the first road and the on-board function, wherein the determining the on-board function based on information about the first road comprises:
  determining the on-board function based on the information about the first road and the mapping relationship.

12. The in-vehicle apparatus according to claim 11, the obtaining of the mapping relationship comprises one of:
  receiving the mapping relationship from a roadside apparatus; or
  obtaining the mapping relationship from the in-vehicle apparatus, the mapping relationship being pre-configured with at least one relationship between road information and the on-board function; or
  receiving, from a server, a map that includes the mapping relationship.

13. The in-vehicle apparatus according to claim 10, the operations further comprising:
  receiving the information about the first road from a roadside apparatus; or
  receiving, from a server, a map that includes the information about the first road.

14. The in-vehicle apparatus according to claim 9, wherein the determining whether the first vehicle is allowed to use the on-board function on the first road comprises:
  determining a first check sequence to obtain a check result, wherein:
  when the check result indicates that a check on the first check sequence succeeds, the first vehicle is allowed to use the on-board function on the first road; and
  when the check result indicates that a check on the first check sequence fails, the first vehicle is not allowed to use the on-board function on the first road, the first check sequence corresponding to the on-board function.

15. The in-vehicle apparatus according to claim 14, the operations further comprising:
  determining, based on the information about the first road, the on-board function that is allowed to be used by the first vehicle on the first road, and obtaining the first check sequence corresponding to the on-board function; or
  determining, the on-board function supported by the first vehicle, and obtaining the first check sequence corresponding to the on-board function.

16. The in-vehicle apparatus according to claim 10, wherein the information about the first road comprises at least one of:
  a type of the first road;
  a geographical range of the first road;
  track information of the first road;
  an identifier of the first road;
  an identity of a lane on the first road; or
  an effective time period associated with the first road, use of the on-board function being permitted within the effective time period.

17. A non-transitory computer readable medium comprising computer executable instructions stored thereon that, when executed by one or more processors, cause an in-vehicle apparatus to perform the following:
  determining an on-board function for a first vehicle;
  determining whether the first vehicle is allowed to use the on-board function on a first road based on a mapping relationship between information about the first road and the on-board function, the mapping relationship being part of a mapping table between a plurality of on-board functions and a plurality of road types;
  when the first vehicle is on the first road, enabling the on-board function when the first vehicle has been determined to be allowed to use the on-board function on the first road;
determining whether the first vehicle is allowed to use the on-board function on a second road; and when the first vehicle is on the second road, disabling the on-board function when the first vehicle has been determined to be not allowed to use the on-board function on the second road, the disabling including preventing manually enabling the on-board function.

18. The non-transitory computer readable medium according to claim 17, wherein the determining the on-board function is based on the information about the first road.

19. The non-transitory computer readable medium according to claim 18, further comprising:
obtaining the mapping relationship between information about the first road and the on-board function, wherein the determining the on-board function based on information about the first road comprises:
determining the on-board function based on the information about the first road and the mapping relationship.

20. The non-transitory computer readable medium according to claim 19, the obtaining of the mapping relationship comprises one of:
receiving the mapping relationship from a roadside apparatus;
obtaining the mapping relationship from the in-vehicle apparatus, the mapping relationship being pre-configured with at least one relationship between road information and vehicle information; or
receiving, from a server, a map that includes the mapping relationship.

21. The non-transitory computer readable medium according to claim 18, further comprising:
receiving the information about the first road from a roadside apparatus; or
receiving, from a server, a map that includes information about the first road.

22. The non-transitory computer readable medium according to claim 17, wherein the determining whether the first vehicle is allowed to use the on-board function on the first road comprises:
determining a first check sequence to obtain a check result, wherein:
when the check result indicates that a check on the first check sequence succeeds, the first vehicle is allowed to use the on-board function on the first road; and
when the check result indicates that a check on the first check sequence fails, the first vehicle is not allowed to use the on-board function on the first road,
the first check sequence corresponding to the on-board function.

23. The non-transitory computer readable medium according to claim 22, further comprising:
determining based on the information about the first road, the on-board function that is allowed to be used by the first vehicle on the first road, and obtaining the first check sequence corresponding to the on-board function; or
determining the on-board function supported by the first vehicle, and obtaining the first check sequence corresponding to the on-board function.

24. The non-transitory computer readable medium according to claim 18, the information about the first road comprises at least one of:
a type of the first road;
a geographical range of the first road;
track information of the first road;
an identifier of the first road;
an identity of a lane on the first road; or
an effective time period associated with the first road, use of the on-board function being permitted within the effective time period.

25. A roadside apparatus, comprising:
one or more processors and a memory, wherein the memory is configured to store program instructions that, when executed by the one or more processor, cause the roadside apparatus to perform operations including:
receiving an identifier of an on-board function from an in-vehicle apparatus;
determining whether a vehicle is allowed to use the on-board function on a first road based on a mapping relationship between information about the first road and the on-board function, the mapping relationship being part of a mapping table between a plurality of on-board functions and a plurality of road types;
sending first information to the in-vehicle apparatus;
determining whether the vehicle is allowed to use the on-board function on a second road;
sending second information to the in-vehicle apparatus; and
when the vehicle is on the second road, disabling the on-board function when the vehicle has been determined to be not allowed to use the on-board function on the second road, the disabling including preventing manually enabling the on-board function.

26. The roadside apparatus according to claim 25, wherein the determining whether the vehicle is allowed to use the on-board function on the first road comprises:
obtaining a first check sequence corresponding to the on-board function; and
sending the first check sequence to the in-vehicle apparatus.

27. The roadside apparatus according to claim 26, wherein the obtaining the first check sequence comprises one of:
calculate the first check sequence based on the identifier of the on-board function;
calculate the first check sequence based on the identifier of the on-board function and a random sequence;
calculate the first check sequence based on the identifier of the on-board function and an identifier of the roadside apparatus; or
calculate the first check sequence based on the identifier of the on-board function, the random sequence, and the identifier of the roadside apparatus.

28. The roadside apparatus according to claim 25, the operations further comprising:
sending indication information to the in-vehicle apparatus, wherein the indication information indicates a request failure or a reason why the vehicle is not allowed to use the on-board function on the first road.

29. The roadside apparatus according to claim 25, the operations further comprising:
sending information about the first road to the in-vehicle apparatus, the determining the on-board function that is allowed to be used by the vehicle on the first road being based on the information about the first road.

* * * * *